United States Patent
Cecchi et al.

(10) Patent No.: US 7,287,015 B2
(45) Date of Patent: Oct. 23, 2007

(54) METHODS AND APPARATUS FOR TRANSMITTING SIGNALS THROUGH NETWORK ELEMENTS FOR CLASSIFICATION

(75) Inventors: Guillermo Alberto Cecchi, New York, NY (US); James Robert Kozloski, New Fairfield, CT (US); Charles Clyde Peck, III, Newtown, CT (US); Ravishankar Rao, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 10/955,141

(22) Filed: Sep. 30, 2004

(65) Prior Publication Data

US 2006/0112035 A1 May 25, 2006

(51) Int. Cl.
*G06F 15/18* (2006.01)
*G06F 15/00* (2006.01)

(52) U.S. Cl. .............. 706/20; 706/22; 706/15
(58) Field of Classification Search ............ 706/20
See application file for complete search history.

(56) References Cited

U.S. PATENT DOCUMENTS

| | | | | |
|---|---|---|---|---|
| 5,174,714 A | * | 12/1992 | Plemmons et al. | 415/177 |
| 5,465,308 A | * | 11/1995 | Hutcheson et al. | 382/159 |
| 5,469,530 A | * | 11/1995 | Makram-Ebeid | 706/25 |
| 5,544,256 A | * | 8/1996 | Brecher et al. | 382/149 |
| 5,680,476 A | * | 10/1997 | Schmidt et al. | 382/159 |
| 5,680,513 A | * | 10/1997 | Hyland et al. | 706/23 |
| 5,794,190 A | * | 8/1998 | Linggard et al. | 704/232 |
| 5,796,920 A | * | 8/1998 | Hyland | 706/20 |
| 5,838,816 A | * | 11/1998 | Holmberg | 382/157 |
| 5,872,779 A | * | 2/1999 | Vaudreuil | 370/352 |
| 6,018,728 A | * | 1/2000 | Spence et al. | 706/20 |
| 6,038,337 A | * | 3/2000 | Lawrence et al. | 382/156 |
| 6,134,538 A | * | 10/2000 | Mager et al. | 706/25 |
| 6,324,532 B1 | * | 11/2001 | Spence et al. | 706/27 |
| 6,411,699 B1 | * | 6/2002 | Fleischer et al. | 379/211.02 |
| 6,463,438 B1 | * | 10/2002 | Veltri et al. | 706/15 |
| 6,519,368 B1 | * | 2/2003 | Kondo et al. | 382/260 |
| 7,003,555 B1 | * | 2/2006 | Jungck | 709/219 |
| 7,007,002 B2 | * | 2/2006 | Matsugu et al. | 706/22 |
| 7,030,814 B2 | * | 4/2006 | Stone et al. | 342/451 |
| 2002/0165839 A1 | * | 11/2002 | Taylor et al. | 706/20 |
| 2004/0059695 A1 | * | 3/2004 | Xiao et al. | 706/25 |

OTHER PUBLICATIONS

R.S. Zemel et al., "Lending Direction to Neural Networks," Neural Networks, vol. 8, No. 4, pp. 503-512, 1995.

(Continued)

*Primary Examiner*—Anthony Knight
*Assistant Examiner*—Adrian Kennedy
(74) *Attorney, Agent, or Firm*—Dwayne Nelson; Ryan, Mason & Lewis, LLLP

(57) ABSTRACT

The present invention provides techniques for transmitting at least one signal through an element of a classification system. One or more input signals are received at the element. One or more functional components are extracted from the one or more input signals, and one or more membership components are extracted from the one or more input signals. An output signal is generated from the element comprising a functional component and a membership component that correspond to one or more functional components and membership components from one or more input signals.

42 Claims, 13 Drawing Sheets

OTHER PUBLICATIONS

J.E. Hummel et al., "Dynamic Binding in a Neural Network for Shape Recognition," Psychological Review, vol. 99, No. 3, pp. 480-517, 1992.

M.C. Mozer et al., "Learning to Segment Images Using Dynamic Feature Binding," Neural Computation, 4, pp. 436-443, 1992.

Y. Choe et al., "Self-Organization and Segmentation in a Laterally Connected Orientation Map of Spiking Neurons," Neurocomputing, pp. 1-20, 1998.

Ruggero Milanese, "Feature Binding through Synchronized Neuronal Oscillations: A Preliminary Study," International Computer Science Institute, TR-94-044, pp. 1-26, 1994.

Y. Choe et al., "Contour Integration and Segmentation with Self-Organized Lateral Connections," Biological Cybernetics, pp. 1-16, 2003.

C. Kayser et al., "Stimulus locking and feature selectivity prevail in complementary frequency ranges of V1 local field potentials," European Journal of Neuroscience, vol. 19, pp. 485-489, 2004.

Christoph von der Malsburg, "The What and Why of Binding: The Modeler's Perspective," Neuron, vol. 24, pp. 95-104 and pp. 111-125, 1999.

K.P. Körding et al., "A learning rule for dynamic recruitment and decorrelation," Neural Networks, vol. 13, pp. 1-9, 2000.

* cited by examiner

PHASE-LOCKING

FIG. 16
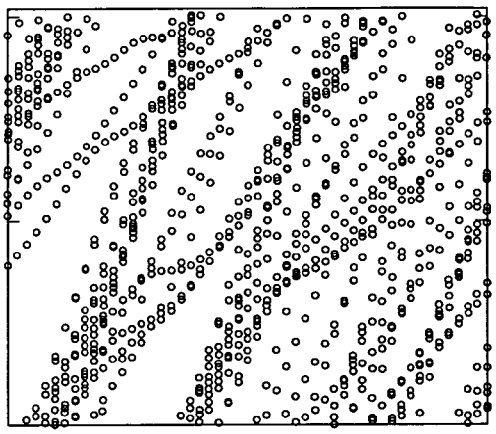
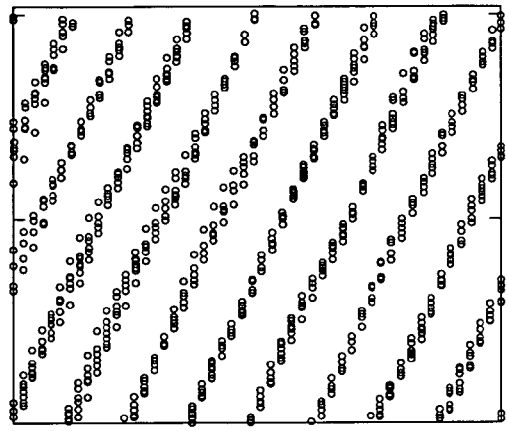
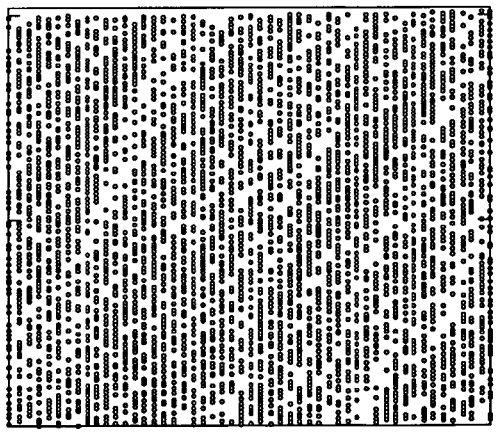
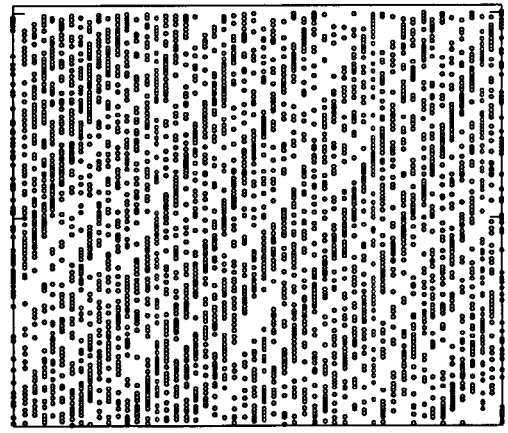

FIG. 17
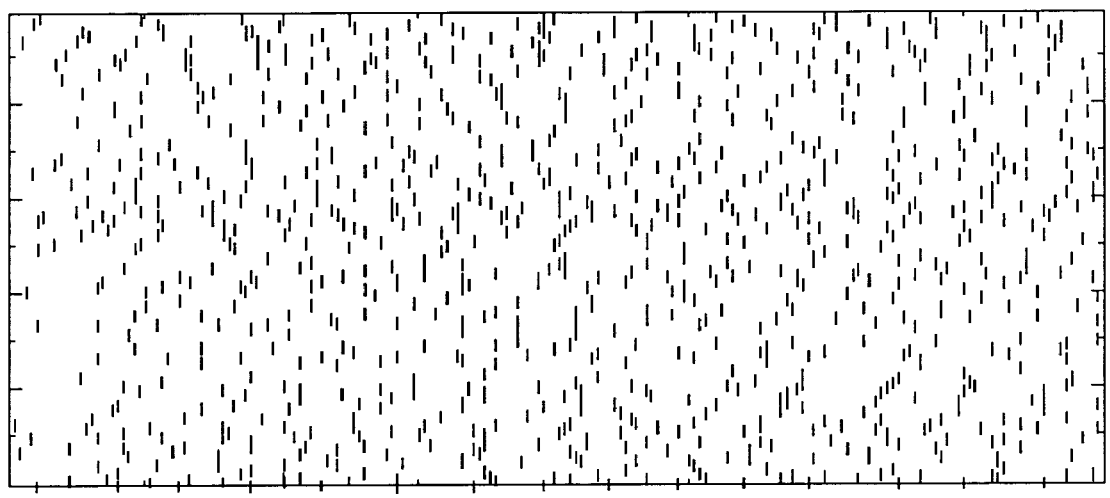
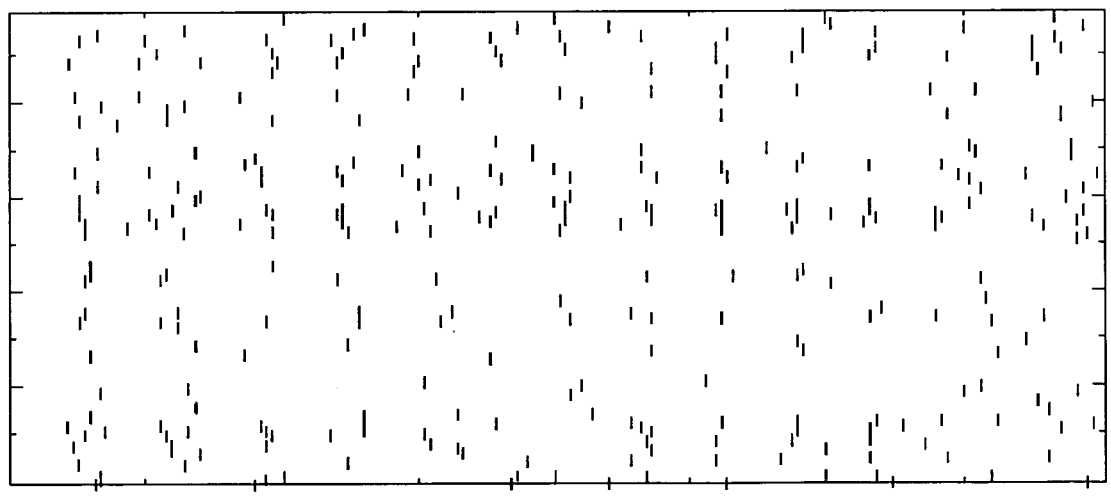

METHODS AND APPARATUS FOR TRANSMITTING SIGNALS THROUGH NETWORK ELEMENTS FOR CLASSIFICATION

FIELD OF THE INVENTION

This present invention is related to techniques for transmitting and classifying signals in a classification system and, more particularly, for transmitting signals through a network of classifier elements with functional and membership components for classification purposes.

BACKGROUND OF THE INVENTION

In practice, a classifier receives a set of measurements or features as input, and assigns a category or class to this set. Thus, the classifier determines the mapping between an input set and a class. There are several types of classifiers, including those that learn, such as, for example, neural classifiers, and those that do not learn, such as, for example, rule-based expert systems. Classifier learning may be supervised or unsupervised. With regard to supervised learning, classes are pre-determined, and the classifier is trained on a set of input data with known classes. With regard to unsupervised learning, the classes are not pre-determined, but emerge from the properties of the distribution of the inputs.

Neural classifiers are based on analogies of the functions of neurons. Each neuron is composed of three key structural components: a dendritic tree, a cell body, and an axon. The dendritic tree receives connections from other neurons at junctions called synapses. The activity of those neurons connected to the dendritic tree can cause changes in the electrical properties of the dendrite. The effect that any one connection has on the electrical properties of the dendrite depends on the properties of its synapse. These changes in electrical properties propagate to the cell body where they are integrated. If the integrated voltage exceeds a threshold, the neuron propagates an output signal along its axon, which makes connections to the dendrites of other neurons. Thus, each neuron receives multiple inputs, which have varying effects on the integrated voltage in the cell body according to the "strength" of its synapses.

To mimic the characteristics of neurons, most neural classifiers treat an input as a real valued vector, where each dimension of the vector corresponds to a single connection from another neural classifier. For each of these inputs, there is a corresponding "weight," which is analogous to the strength of the synapse. This set of weights can be represented as a weight vector. To mimic the integrative properties of the cell body, neural classifiers perform a weighted sum of its inputs, which is equivalent to performing a dot product of the input and weight vectors. To mimic the threshold controlling the output of the neuron, the weighted sum is mapped by a non-linear activation function, such as a sigmoid. This mapped value is considered the output of the neural classifier.

The weights used in the computation of the neural classifier can be either fixed or modifiable. When the weights are modified, they are done so in accordance with a learning rule, which specifies a general method for the modification. A commonly used learning rule is Hebb's rule, which strengthens a weight if the source and destination neural classifiers are concurrently active.

The model of a single neural classifier described above is also known as a perceptron. The input to a perceptron consists of an N-dimensional vector of real values, which can be considered a point in the N-dimensional input space. The perceptron multiplies the input by an N-dimensional weight vector that it possesses. The weight vector defines an (N-1)-dimensional hyperplane that is normal to the weight vector and that divides the input space into two regions. The perceptron generates a positive response if the point corresponding to the input vector lies on one side of the hyperplane and generates a negative response if it lies on the other. A positive response indicates that the input belongs to a first class, and a negative response indicates that input belongs to a second class. Consequently, a perceptron is useful for classification problems that are linearly separable; that is, where the regions of the input space corresponding to two separate classes can be separated by a hyperplane. An input dimension is considered to contribute to the output if its weighted value is of the same sign as the response. The significance of individual contributing input dimensions increases as the magnitude of their weighted values increases. Typically, perceptrons are not used in isolation, but connected together in networks.

It is possible to use perceptrons to classify non-linearly separable regions of the input space as a single class. This requires constructing a "multi-layer" network, where perceptrons in the first layer receive the inputs from the input space and produce intermediate classifications. These intermediate classifications are used as inputs to a subsequent "layer." The outputs of the second layer may be considered the overall classification output or they can serve as inputs to subsequent "layers." The number of layers is a design parameter, where two is the most common choice, as it has been shown that a sufficiently large, two-layer network is functionally equivalent to networks with more layers. The connectivity in the network is typically fixed, which means that the connections among classifiers in the network are not created, destroyed, or reassigned during the operation of the network.

As an example of network organization, a biologically inspired network having a hierarchical organization of classifier maps is described. A classifier map is a two dimensional array of classifiers. The input to such a network is usually one or more two dimensional arrays of sensors. Biologically inspired examples of inputs include light detectors arranged in the retina and touch sensors embedded in the skin. Each map is responsible for classifying one or more attributes of the input arrays. For example, the initial map of the visual system takes inputs indirectly from the retina and classifies the existence and orientation of edges of the visual scene. Each classifier only considers visual information in a limited region of the input space. Furthermore, nearby classifiers in the output map typically have overlapping regions of interest that are also proximately positioned in the input map. This property establishes a "topographic" mapping from the retina to the initial visual system map.

Typically, classifier maps serve as inputs to other classifier maps. This enables the integration of information from lower maps and the identification of combinations of attributes and relationships in the input space. Furthermore, every classifier output of a hierarchical map can be considered a portion of the network output. Such outputs could be used to generate a response or behavior that is predicated on the existence of combinations of attributes in the input space.

Such hierarchical networks of classifiers, however, have a fundamental limitation. In F. Rosenblatt, "Principles of Neurodynamics: Perceptrons and the Theory of Brian Mechanisms," Spartan Books, Washington D.C., 1962, this limitation is illustrated with the following example. Consider a hierarchical network, as described above, with outputs that respond to the four following attributes of a visual scene: 1) the presence of a square, regardless of its location in the input space; 2) the presence of a triangle, regardless of its location in the input space, 3) the presence of a visual object in the top half of the image, regardless of the nature of the object; and 4) the presence of a visual object in the bottom half of the image, regardless of the nature of the object. In further augmenting Rosenblatt's example, first consider that the network has an initial map that receives the sensory input and generates a topographic response to fundamental attributes, like line segments, and projects to the classifiers for the four attributes described above. Second, consider that this network has an additional output layer that generates a behavior when a square exists in the top of the image.

This example network would clearly respond properly in each of the four cases where a single object is present in the image. When a square is present in the top of the image, the desired behavior would be generated because both attributes of the input space are recognized. When the square is in the bottom or when a triangle is present in either the top or bottom of the image no behavior would be generated because the two required attributes ("square" and "top") are not simultaneously recognized.

When two objects are presented to the network, however, an erroneous response can occur. In particular, when a triangle is present in the top of the image and a square is present in the bottom, both attributes required for the behavior will be simultaneously present and the behavior will erroneously take place. For example in von der Malsburg et al., "The What and Why of Binding: The Modeler's Perspective," Neuron, Vol. 24, 95-104, September 1999, it is observed that the classical neural network ". . . has no flexible means of constructing higher-level symbols by combining more elementary symbols," and that "coactivating the elementary symbols leads to binding ambiguity when more than one composite symbol is to be expressed."

Rosenblatt's example only illustrates one half of the current problem, the "superposition catastrophe." A related problem is "component discrimination." Component discrimination involves responding to the attributes that 1) were originally recognized in different maps or map locations, and 2) gave rise to a higher level classification that predicates the response. Both the "superposition catastrophe" and "component discrimination" problems can be illustrated with the following example.

Consider a system that takes as its input an electronic representation of an image of a natural scene that includes a tulip amid blades of grass. The tulip will be of fixed size and orientation, but can exist anywhere in the image. The task of the system is to change the color of the image pixels representing the contours of the flower. This task is to be performed by a fixed network of classifiers, called the decision subsystem, that classifies the various attributes and patterns in the visual scene and controls the pixel coloring action.

The decision subsystem has the following properties. It includes "edge" classifiers that respond to edge information at each pixel location. It possesses "contour" classifiers that respond to contours in the image derived from topographically-registered, co-oriented, and co-linear edge classifier responses. It has a "tulip" classifier that takes the outputs of contour classifiers as inputs and generates a positive response when a tulip is present anywhere in the image. The tulip classifier may exist within a complex, multi-layer, fixed sub-network of classifiers. The decision subsystem must then direct the coloring means to the precise locations of contour information in the image that contributed to tulip recognition.

This example illustrates both the superposition catastrophe and component discrimination problems. It illustrates the component discrimination problem because it possesses each of the three requirements: 1) the system must respond to the locations of edge classifiers, 2) these edge classifiers are recognized in different locations of the edge classifier map, and 3) the edge classifiers contribute to contour classifiers. It also illustrates the superposition catastrophe problem because the decision subsystem must respond when an edge is recognized at a pixel location, the edge is such that it contributed to a tulip classification, and other edges corresponding to grass blades are also present.

This tulip contour coloring problem statement precludes common techniques that alter the relationships among image pixels and processing elements during the course of tulip recognition and coloring response. Since there is no means to interact with the natural scene, it is not possible to pan a camera across the scene to translate the pixel information for location constrained classification. Furthermore, since the network is fixed, it is not possible to use indirect addressing in a computer with random access memory to perform operations, such as convolutions. Creating networks that could respond to every combination of attributes would be intractable.

There is one traditional approach that could, theoretically, solve the superposition catastrophe and component discrimination problems, and our combined exemplar, the tulip coloring problem. To be specific, networks of spiking models of neurons can exploit spike timing differences to modulate the effects of lower level classifiers on higher level classifiers. Spike models of neurons connected in a network could create synchronized firing patterns that would perform both classification and prevent higher level neurons from responding to lower-level neurons that are sufficiently unsynchronized. This would, for example, enable tulip contour coloring classifiers to ignore contours emanating from grass blades. Modeling classifier networks at this level of timing resolution, using the temporal dynamics of neurons, requires aggregations of spiking inputs produced by ensembles of classifiers to replace a single classifier that communicates and uses timing information at a higher level of abstraction. Modeling networks using spiking responses and the temporal dynamics of neurons would require many orders of magnitude more computation and communication than models at higher levels of abstraction. This would be computationally tractable for only very small problems.

SUMMARY OF THE INVENTION

The present invention relates to the transmission of signals through a network of classifier elements and, more particularly, to the generation of a response or action that is based on functionally related representations of attributes of an input space and is independent of non-functionally related attributes. This is referred to as the "coherent substrate response." The present invention provides techniques that establish functional relationships among classifiers in a network. The embodiments of the invention also introduce a novel "function/membership" classifier that enables highly efficient establishment of functional relationships across a network.

For example, in one aspect of the invention, at least one signal is transmitted through a element of a classification system. One or more input signals are received at the element. One or more functional components are extracted from the one or more input signals, and one or more membership components are extracted from the one or more input signals. An output signal is generated from the element comprising a functional component and a membership component that correspond to one or more functional components and membership components from one or more input signals.

In an additional embodiment of the present invention, signals are transmitted in a network of elements. Signals are communicated from each of a plurality of source elements to at least one destination element in the network of elements. Each signal comprises a functional component and a membership component. A new signal is generated at each destination element comprising a functional component and a membership component. These components are dependent on one or more functional components and membership components communicated from one or more respective source elements. The steps of communicating signals and generating a new signal are repeated until one or more final destination elements are reached. A given source element in a next subsequent iteration comprises a destination element in a current iteration, and a communicated signal in the next subsequent iteration comprises a new signal in the current iteration.

Solving the coherent substrate response problem involves establishing a coherent substrate and then generating a response or action. Advantageously, the embodiments of the present invention solve the problem by creating a coherent substrate of classifiers. Further, the embodiments of the present invention preserve the sparse connectivity of traditional classification networks while performing extremely complex classification tasks dependent on the outputs of all the other classifiers in the network. The embodiments also enable the computation of multiple, independent classifications in parallel within the same network.

Further advantages include the enablement of the formation of consistent subsets of classifiers (classification sub-networks) subject to the constraints imposed by the network designer or a self-organizing process. The embodiments of the present invention also enable competition among self-consistent classification sub-networks, which can be used to form the basis of the classification network output or response.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 16 is diagrams illustrating a role of feedback in a phase model, according to an embodiment of the present invention;

FIG. 17 is diagrams illustrating synchronization without function/membership values, according to an embodiment of the present invention;

DETAILED DESCRIPTION OF PREFERRED EMBODIMENTS

Figure 1:
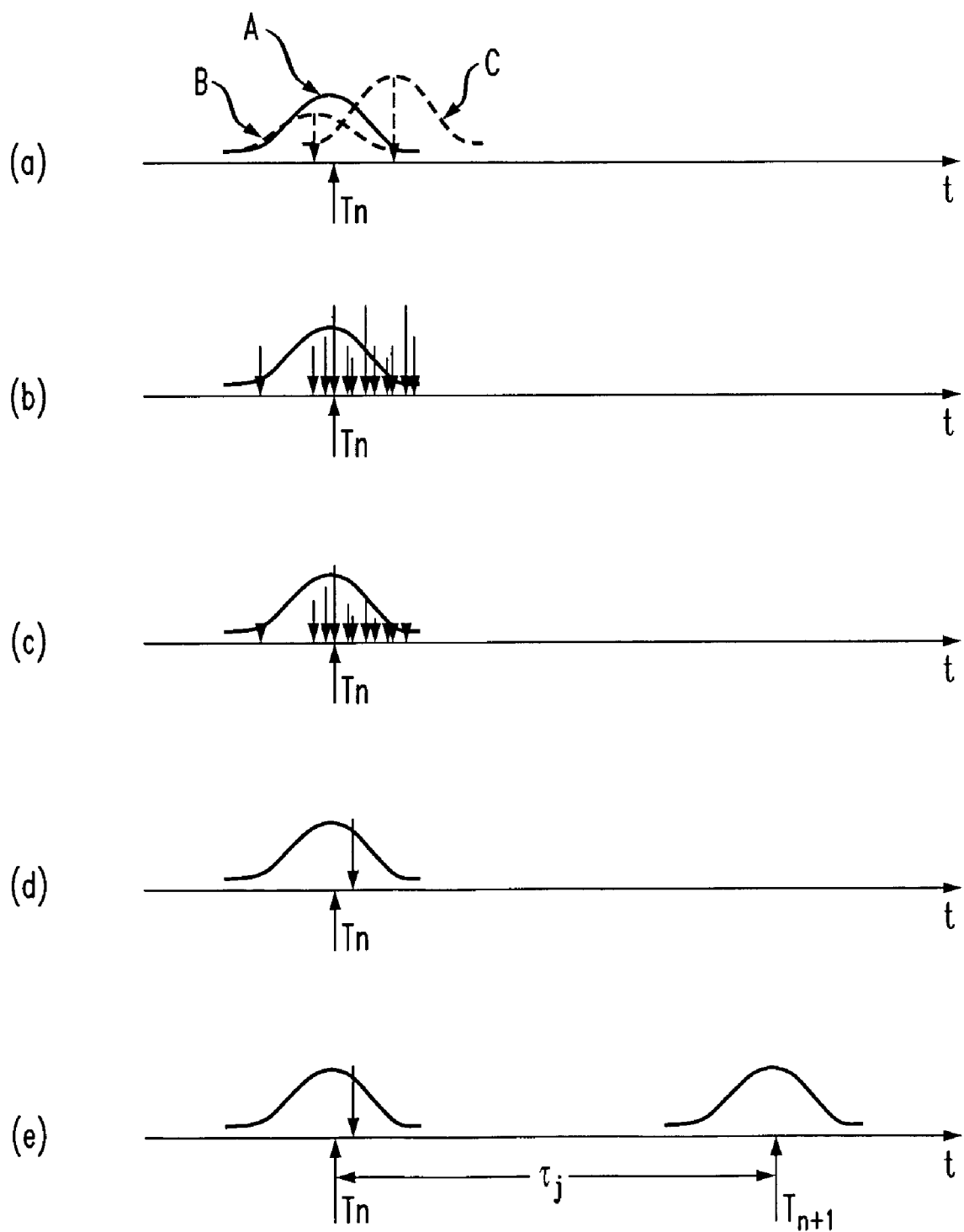
FIGS. 1a-1e are diagrams illustrating a current pulse and the effect of incoming pulses on a period of a receiving element, according to a first embodiment of the present invention.

The following description will illustrate the invention using an exemplary data processing system architecture. It should be understood, however, that the invention is not limited to use with any particular system architecture. The invention is instead more generally applicable to any classification system in which it is desirable to perform signal transmission and classification through machine learning and pattern recognition.

As will be illustrated in detail below, the present invention introduces techniques for transmitting and classifying signals in a classification system and, more particularly, for transmitting signals through a network of elements with functional and membership components for classification purposes.

The embodiments of the present invention comprise the following key components: a set of input values, a set of classifiers, a network configuration for the classifiers, a means to produce a response or action, and possibly a target apparatus to apply the action. A classifier may be referred to herein as a classifier element or simply an element. There are many potential embodiments for each of these components, some of which must be tailored to the intended class of applications.

In order to solve the problems described above, particularly those illustrated in the tulip classifier example, a means for maintaining the implicit relationships between the attributes of a stimulus is required as those attributes are decomposed and classified by distributed maps. This implies a feedforward signaling of relationships that exist in the input. Solving the discrimination problem further requires a means for establishing a relationship among components that contribute to a classification. This implies a feedback signaling of relationships from the classifier to the component classifiers. Finally, this feedforward and feedback signaling would only be useful for binding attributes together if inputs with different signals are treated differently and unrelated attributes do not share common signals.

Conceptually, this feedforward and feedback signaling effectively partitions the network into unambiguous classifier subnetworks, where the members of each classifier subnetwork share "functional relationships" with each other. Functionally related classifiers signal that they are related to each other and their classifications are consistent with each other. Their classifications are consistent if the weighted inputs to a classifier from other classifiers in the same subnetwork contribute to the classifier's output. Two classifiers have a simple functional relationship to each other if they share a direct connection, the response of one contributes to the response of the other for the specific input pattern, and they both signal that they are related to each other. Two classifiers have a complex functional relationship if there is no direct connection between them, but there is a chain of simple functional relationships that transitively connect them for the specific input pattern. To have a functional effect, classifiers that do not have a simple or complex functional relationship to the classifiers generating the response of the system must have a diminished or negligible effect on the response of the system.

The conceptual foundation of the function/membership classifier is conditional classification. Like other classifiers using vectors of real values as inputs, conditional classifiers determine the extent that an input belongs to one class or its complement. Traditional, non-conditional classifiers, like a perceptron, perform the classification based on all dimensions of their input vectors and each input is treated as having equal significance to the weighted sum used for classification.

In contrast, conditional classifiers independently modulate the significance of each dimension of the input vector, prior to performing the weighted sum, according to a predicate applied to each input dimension. The predicate that will be used in the function/membership classifier is a dynamic measure of the extent that a classifier acting as an input to another classifier shares a functional relationship with the other classifier. Thus, it is as though each input dimension has two weights applied to it, the conventional weight, such as one in a perceptron, and a modulating weight, whose strength is a function of a dynamic measure of the functional relationship between the input and receiving classifiers.

The function/membership classifier (referred to herein as "FM classifier"), is similar in its core characteristics to a perceptron. Like a perceptron, it performs a weighted sum of its "functional" inputs and maps this value to its "functional output" using a non-linear activation function. The "functional" inputs are those that pertain to the function of the classifier, which is classification. A scalar value or a product of a scalar value and a computed value may be applied to each of the functional inputs.

The FM classifier differs from the perceptron in the information it communicates to other FM classifiers. In addition to the functional information the perceptron conveys, the FM classifier also conveys "membership" information. Consequently, each FM classifier input dimension, in the nominal case, has two attributes, a functional value and a membership value. Each FM classifier also produces an output with these two attributes.

The membership value produced by an FM classifier is that classifier's "membership value." This value is typically initialized to a unique or rare, randomly generated value within a prescribed range. The difference between an input dimension's membership value and that of the receiving classifier is a measure of the "functional relationship" between the classifier corresponding to the input dimension and the receiving classifier.

The membership value differences are used for two key purposes. The first is to modulate the effect of the functional value of an input dimension. Typically, the more similar the membership values, the larger the effect. Conversely, the larger the difference, the smaller the effect. Thus, the effect two input dimensions with the same functional value have on the functional output of the classifier will vary if their corresponding membership values differ from the membership value of the receiving classifier by different amounts. An input dimension with a sufficiently large membership value difference can render the receiving classifier "blind" to the functional value of that dimension.

The second use is to alter the membership value of the receiving classifier. This is typically done by making the membership value of the receiving classifier more similar to the membership values of its input dimensions weighted by their significance. The significance of each input dimension is a function of both the functional value and the membership value difference for that dimension.

Three classifier embodiments of the present invention are disclosed. The first and preferred embodiment implements the functional and membership values as the amplitude and the timing of discrete pulses. The second embodiment uses the amplitude and the continuous phase of an oscillator to implement the FM values. In both the first and second embodiments the update equations for the membership value (timing, phase) are a function of the difference between the membership value of a classifier element and that of the input signal provided by another classifier element. The third embodiment implements the functional value as the average number of discrete pulses generated by a spiking element over a small window of time, and the membership value by the timing of those pulses. In contrast with the first two embodiments, the third embodiment does not utilize the membership difference between receiving elements and input elements to compute the receiving element membership value, and thus is qualitatively different.

In the first embodiment of the classifier element, timing information of signals processed by the element is modeled mathematically as follows. The output of a classifier element is denoted by $S_j(t)$, where j is an index indicating the specific element. It is assumed that $S_j(t)$ is constructed from two classes of waveforms. One is pulsatile and nearly periodic, and the other is nearly constant within the period of the pulsatile waveform. The underlying reason for modeling the signals in this way is that the model is intended to represent the aggregate behavior of a collection of neurons, and the effect this collection has on another collection of neurons. Though the preferred embodiment is described with reference to these two classes of waveforms, the analysis technique can be extended to multiple classes of waveforms in the spirit of this invention.

When $S_j(t)$ is represented as a nearly constant value, the amplitude of the signal will be interpreted as the functional value of the classifier and the signal will be interpreted to be without a membership value. When $S_j(t)$ is represented as a pulsatile waveform, the amplitude of the pulses will be interpreted as the functional value of the classifier element, and the timing of the pulses can be interpreted as the membership value of the classifier element.

This embodiment of the classifier element consists of a computer program which proceeds in iterative steps that correspond to a time interval of a fixed duration. The duration between pulses emitted by an element is not fixed. In each iterative step the effect of the inputs to a classifier element that arrive within the corresponding time interval is computed. $S_j(t)$ may be characterized for each iterative step with an estimate that has both pulsatile and constant waveform components, as represented in FIGS. 1a-1e.

Referring initially to FIG. 1a, a diagram illustrates a current pulse, as denoted by A along time t. Incoming pulses are shown in dashed lines denoted by B and C. FIG. 1b illustrates several incoming pulses with arrows representing their times.

Let $S_j(t)$ be parameterized by $\gamma$, T, and $\rho$, and defined over the iteration time intervals indexed by n:

$$S_{j,n}(t) = \beta_1 \gamma_{j,n} P(t, T_{j,n}) + \beta_2 \rho_{j,n}$$

where $P(.)$ describes the pulsatile component, $T_{j,n}$ denotes the reference time of the pulsatile component (which is nominally the center of the pulse), $\gamma_{j,n} \in (0,1)$ denotes the amplitude of the pulsatile component, and $\rho_{j,n} \in (0,1)$ denotes the amplitude of the constant component. The values $\beta_1$ and $\beta_2$ are arbitrary constants.

The pulsatile component $P(t,T)$ is a pulse-shaped function of time defined relative to T and varies from zero to one. It is assumed that each classifier element j has a natural period $\tau_j$ describing the time required for inputs to propagate through the classifier element and generate the output signal $S_j(t)$. This signal also gates and shapes the contribution of incoming signals for the creation of a subsequent pulse. As shown in FIG. 1c, a diagram illustrates a modulation of the amplitude of each arrow representing incoming pulses by the pulse shape of the receiving element. Inputs are weighted according to their temporal proximity with the classifier element's reference time. In this way, within the time interval of an iterative step, inputs arriving near the reference time of the element have maximal effect, whereas the effect withers for arriving times away from the reference time.

Formally, any function that satisfies the following requirement is a candidate for modeling $P(t,T)$: for each classifier element j at interval n, there exists $\delta$ such that $$0 < \delta < \frac{\tau_j}{2} \text{ and } |t - T_{j,n}| < \delta \Rightarrow 0 \leq P(t.T_{j,n}) \leq \varepsilon,$$

where $0 \leq \varepsilon < 1$ is an a value to be chosen as a parameter. For example, choosing $\varepsilon=0$ implies that for an arrival time sufficiently distant form the reference time, the effect of the input will be null. For analytical and computational reasons, the following models $P(t,T)$:

$$P(t,T) = e^{-(t-T)^2/2\sigma^2}$$

Figure 2:
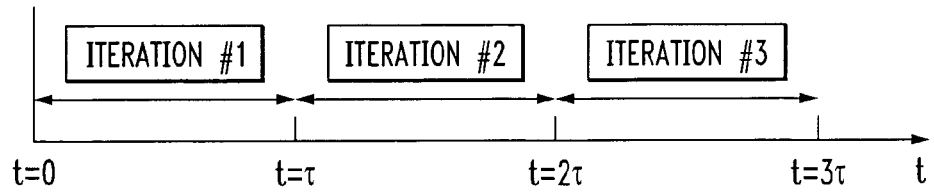
FIG. 2 is a diagram illustrating a relationship between an iteration number and a time interval, according to a first embodiment of the present invention.

The index n enumerates successive intervals, as illustrated in more detail in FIG. 2. For each classifier element j, the $n^{th}$ interval is:

$$\left[T_{j,n-1} + \frac{\tau_j}{2}, T_{j,n} + \frac{\tau_j}{2}\right)$$

Note that $\gamma_{j,n}$ can equal zero in this model, indicating that no pulse occurred within time interval n. In this case, the interval cannot be defined relative to the pulse reference time and is therefore defined relative to the previous reference time:

$$\left[T_{j,n-1} + \frac{\tau_j}{2}, T_{j,n-1} + \frac{3\tau_j}{2}\right)$$

The means for computing the signal parameters for the classifier elements will now be presented.

Referring now to FIG. 1d, a diagram illustrates a current pulse and a net time shown by a heavy arrow. Connections from a source classifier element to a destination element possess a weight which is used to multiply an input signal from a source element. The following constraints are imposed on the weights. Let $w_{i,j,n}$ be the weight of the $i^{th}$ input to the $j^{th}$ classifier element during the $n^{th}$ interval. Let N be the total number of inputs received by this element. A weight vector is defined as consisting of the weights of the inputs for any interval n as follows: $\vec{W}_{j,n} = (w_{1,j,n}, \ldots, w_{i,j,n}, \ldots, w_{N,j,n})$. The weight vectors are initialized such that they have unit norm, $|\vec{W}_{j,n}|=1 \forall j,n$, and are uniformly distributed on the surface of the N-dimensional hyper-sphere of radius 1. (A hyper-sphere is a generalization of a sphere, and in N dimensions is the locus of points that are equidistant from the center of the sphere).

All classifier elements are assumed to generate spontaneous noise under quiescent conditions; that is, $S_j(t)=q$ under quiescent conditions, where q is a global value that represents the level of the spontaneous noise. In $S_{j,n}(t)$ of equation (1), this corresponds to setting $\gamma_{j,n}=0$ and $\rho_{j,n}=q$. Synapses adapt to this quiescent signal by effectively subtracting it from the input signal.

FIGS. 1a-1e are referred to in order to understand the effect that input signals can have on a classifier element. Referring now to FIG. 1e, a diagram illustrates the change of a period or interval duration of the receiving element after the affect of the incoming signals. Further, FIG. 2 illustrates the relation between the iteration number and the corresponding time interval.

For each classifier element j, the intrinsic interval duration $\tau_j$ represents the interval duration when the classifier element is not affected by other signals. Initially, this duration is randomly selected in a range such that for every other classifier element i that is connected to element j, there will always be precisely zero or one reference time $$T_{i,m_i} \in \left[T_{j,n-1} + \frac{\tau_j}{2}, T_{j,n} + \frac{\tau_j}{2}\right)$$

regardless of the interval adjusting effects of the inputs to classifier element j. For this preferred embodiment, $\tau_j$ was chosen to fall between 23 and 27 milliseconds, and the iteration time step was 16.67 milliseconds. The contribution $\psi_{i,m_i \to j,n}$ of a pulse $m_i$ from classifier element i to pulse n of classifier element j is zero, unless the following condition is satisfied:

$$\exists T_{i,m_i} \in \left[T_{j,n-1} + \frac{\tau_j}{2}, T_{j,n} + \frac{\tau_j}{2}\right),$$

in which case $$\psi_{i,m_i \to j,n} = w_{ij} \int_{-\infty}^{\infty} (S_{i,m_i}(t) - q) P(t, T_{j,n}) dt$$

This reduces to the following expression with the proper choice of constants:

$$\psi_{i,m_i \to j,n} = w_{ij} \gamma_{i,m_i} e^{\left(\frac{T_{i,m_i} - T_{j,n}}{2\sigma}\right)^2} + \rho_{i,m_i} - q$$

Figure 3:
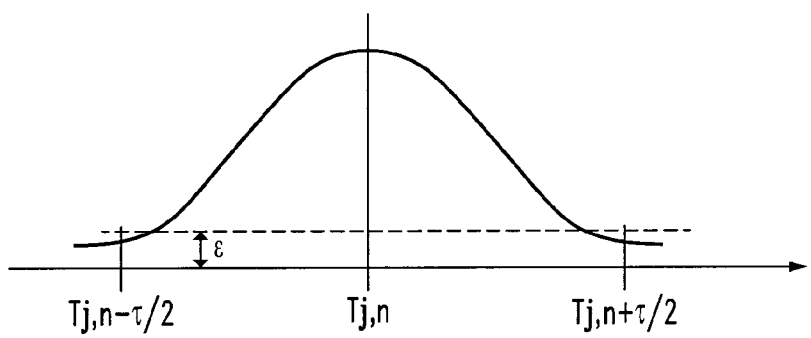
FIG. 3 is a diagram illustrating a weighting function for integration of inputs, according to a first embodiment of the present invention.

The value of $T_{j,n}$ is computed as a function of the amplitude and timing of pulses received from the set of inputs. Since the nearly constant component of the time-shifting inputs does not influence $T_{j,n}$, the contribution of the timing of a pulse m from classifier element i to $T_{j,n}$ can then be defined as:

$$\psi^{TS}_{i,m_i \to j,n} = \psi_{i,m_j,n} - w_{ij} \rho_{i,m_i}$$

where $\psi^{TS}_{i,m_i \to j,n}$ is used to weight the time difference between the input pulse and the windowing pulse in the computation of $T_{j,n}$. This weighting process is illustrated in FIG. 3. For any pulse n of classifier element j, $T_{j,n+1}$ can now be described as follows.

$$T_{j,n+1} = \begin{cases} T_{j,n} + \tau_j, \text{ if } \gamma_{j,n} = 0 \\ T_{j,n} + \frac{\sum \psi^{TS}_{i,m_i \to j,n}(T_{i,m_i} - T_{j,n})}{\psi^{TS}_{\max}} + \tau_j, \text{ otherwise} \end{cases}$$

Note that the timing of the pulse is affected by the term $(T_{i,m_i} - T_{j,n})$ which is the difference of the membership values of the input signal and the receiving element. The pulse shape of the receiving element has been used to adjust the contribution of the inputs, which is why this embodiment exhibits the operation of an FM classifier element.

In addressing the computation of $\gamma_{j,n+1}$ and $\rho_{j,n+1}$ i.e., the functional components of the signal, the notion of classes of inputs, such that one class of inputs affects the functional component and the timing information, and another class affects the timing information and the functional component in a different manner must be introduced. For instance, a class called 'feed-forward' inputs affect timing and generates the functional component of the signal, while a second class called 'feedback' inputs affects the timing information, but only modulates the pulsatile component of the functional value by means of a "feedback gain" factor. Thus, for computation of $\gamma_{j,n+1}$ and $\rho_{j,n+1}$, the total functional input is defined as $$\psi^{TF}_{j,n} = \sum_{i \in FF} \psi_{i,m_i \to j,n}$$

and the feedback gain is defined as $$\psi^{BG}_{j,n} = \psi^{BG}_{j,n-1} + \frac{(1 - \psi^{BG}_{\min}) \sum_{i \in FB} \psi_{i,m_i \to j,n}}{\psi^{FB}_{\max}}$$

where $\psi^{FB}_{max}$ is the maximum total feedback input measured for minicolumn j as an autoregressive average of feedback input totals that exceed the current maximum, and $\psi^{BG}_{min}$ is chosen to be the minimum desired feedback gain.

Then, the amplitudes of the pulsatile and constant components are computed as:

$$\begin{cases} \gamma_{j,n+1} = \sigma(\psi^{TF}_{j,n} \cdot \psi^{BG}_{j,n}, \alpha, \beta) \\ \rho_{j,n+1} = 0 \end{cases} \text{ if } \exists i \in FF : \rho_{i,m_i} > q$$

$$\begin{cases} \gamma_{j,n+1} = 0 \\ \rho_{j,n+1} = \sigma(\psi^{TF}_{j,n}, \alpha, \beta) \end{cases} \text{ otherwise}$$

where $\sigma(x,\alpha,\beta) = (1 + e^{-\alpha(x-\beta)})^{-1}$ is a sigmoid function parameterized by $\alpha$ and $\beta$. In the embodiment:

$$\alpha = \frac{1.1}{\psi^{TF}_{\max}}, \text{ and}$$

$$\beta = \frac{-1.1}{\alpha} + \psi^{TF}_{\max},$$

where $\psi^{TF}_{max}$ is the maximum total functional input measured for minicolumn j as an autoregressive average of functional input totals that exceed the current maximum.

In the second embodiment of the classifier element, the amplitude and phase of an oscillator are used to implement the FM values. Thus, interactions between elements are not represented in terms of signal timing, but in terms of the phase of the signals, which in contrast with the previous embodiment are constantly compared and updated. Each FM element is an oscillator with the following variables:

Phase: $\theta(t) \in [0, 2\pi)$

Frequency: $\tau(t)$

Natural Frequency: $\tau_0 \in [\tau_{min}, \tau_{max}]$

Amplitude: $\rho(t) \in [0,1]$

The amplitude $\rho$ can be considered to be the functional value of the classification. The phase $\theta$ of the classifier element is considered to be its membership value. The relationship between the phase of the input element and that of the receiving element plays a role in the computation of the output as follows.

Figure 4:
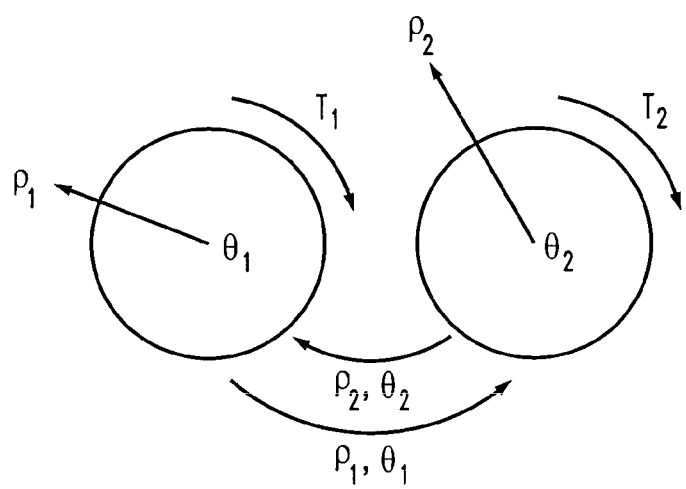
FIG. 4 is a diagram illustrating interacting classifier elements, according to a second embodiment of the present invention.

Referring now to FIG. 4, a diagram illustrates a first classifier element interacting with a second classifier element. Classifier elements interact with each other by communicating their phase and amplitude. Each element then adjusts its own phase, amplitude and period based on its previous state and all the inputs it receives.

Figure 5:
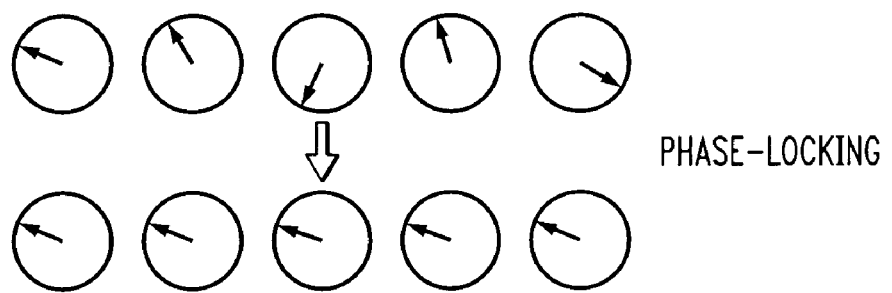
FIG. 5 is a diagram illustrating a phase-locking phenomenon of classifier elements, according to a second embodiment of the present invention.

Referring now to FIG. 5, a diagram illustrates a phase-lock phenomenon, according to an embodiment of the present invention. The desired behavior of a collection of connected classifier elements is to achieve the phase-lock. Initially there is a wide variability in the phases of all the classifier elements. After phase-lock, the classifier elements possess an identical phase.

The final phase-lock is a consequence of the manner in which the phase, amplitude and period updates are carried out. Each unit adjusts its phase based on its current period and the centroid of the incoming phases. The period is adjusted based on this phase change and a relaxation to its natural period. The amplitude is adjusted based on an adaptation term and a combination of incoming amplitudes weighted according to their phase coincidence.

The following are equations that describe the evolution of the three variables $\rho(t)$, $\theta(t)$ and $\tau(t)$ for each unit:

$$\rho_i^I = \sigma\left(\sum_j w_{ij}^R \rho_j^R\right)$$

$$\dot{\theta}_i^I = 2\pi/\tau_i^I + \frac{\alpha}{N_i}\rho_i^I \sum_{j=1}^{N_i} w_{ij}^{FB} \rho_j^U \Phi(\theta_{ij}^{IU})$$

$$\dot{\tau}_i^I = -\mu(\tau_i^I - \tau_{i_0}^I) + \frac{\alpha}{N}\rho_i^I \sum_{j=1}^{N} w_{ij}^{FB} \rho_j^U \Phi(\theta_{ij}^{IU})$$

$$\rho_i^U = \sigma\left(\sum_j w_{ij}^{FF} \rho_j^I\right)$$

$$\dot{\theta}_i^R = 2\pi/\tau_i^R + \frac{\alpha}{M_i}\rho_i^U \sum_{j=1}^{M_1} w_{ij}^{FF} \rho_j^I \Phi(\theta_{ij}^{UI})$$

$$\dot{\tau}_i^U = -\mu(\tau_i^U - \tau_{i_0}^U) + \frac{\alpha}{M_i}\rho_i^U \sum_{j=1}^{M_i} w_{ij}^{FF} \rho_j^I \Phi(\theta_{ij}^{UI})$$

where $\rho_i^I$ ($\rho_i^U$) is the amplitude of the i-th unit in the input (upper) layer, $\theta_i^I$ is the phase, $\tau_i^I$ the period, $\tau_i^R$ is the amplitude of the i-th receptor unit, $w_{ij}^R \geq 0$ is the connection strength between the j-th receptor unit and the i-th input unit, $w_{ij}^{FB} \geq 0$ is the strength of the connection between the j-th unit of the upper layer and the i-th unit of the input layer, $\sigma$ is a monotonic function of its input, $\theta_{ij}^{IU}=\theta_j^U-\theta_i^I$, and $\Phi(.)$ is defined as:

$$\Phi(x) = \begin{cases} \sin(\gamma x) & \text{if } |x| < 2\pi/\gamma \\ 0 & \text{if } |x| \geq 2\pi/\gamma \end{cases}$$

The objective is to create an "attraction" zone for similar phases, and a "repulsion" zone for more distant phases, up to a limit ($2\pi/\gamma$ in this case) above which phase differences are irrelevant.

Figure 6:
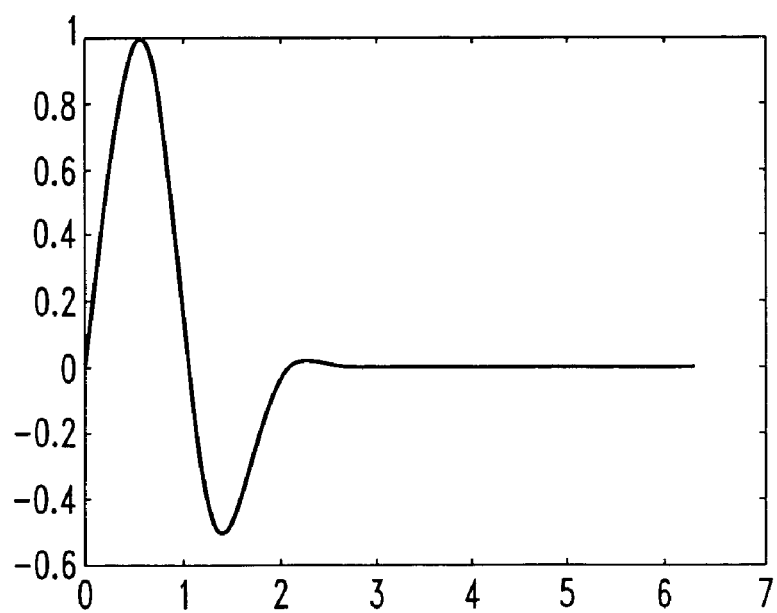
FIG. 6 is a graph illustrating a phase update function, according to a second embodiment of the present invention.

Referring now to FIG. 6, a diagram illustrates a phase update function, according to a second embodiment of the present invention. As shown, as an alternative, the function can be defined as $\Phi(x)=\sin(\gamma x)e^{-\beta(\cos(x/2)-1)^2}$ such that the parameters allow for only one positive peak. The horizontal axis of FIG. 6 is measured in radians where $\gamma=3.0$ and $\beta=10.0$.

Note that the output of the receiving element is affected by the term $\theta_{ij}^{IU}=\theta_j^U-\theta_i^I$, which is the difference of the membership values of the input signal and the receiving element. The phase of the receiving element has been used to adjust the contribution of the inputs, which is why this embodiment exhibits the operation of an FM classifier element.

The nature of the coupling between two classifier elements possessing different phases is examined, according to the set of equations described above. It is assumed that the periods of the two classifier elements are close to each other. It is important to create a distance measure between two phases, for example, $\theta_1$ and $\theta_2$. The reason for this being that the interaction between two classifier elements is a function of this distance measure.

Let $\theta_{12}$ be the difference between two phases, such that $\theta_{12}=\Gamma_2-\theta_1$. Note that $\theta_{12}$ is a circular variable, i.e. $\theta_{12}=\theta_2-\theta_1)\mod 2\pi$. The proper numerical handling of a circular variable implies several steps of logic. Instead, for computational ease, the quantity $\sin(\theta_{12})$ is used as a measure of the distance between two phases. The sin function is well-behaved and does not exhibit discontinuities. In addition to using the sin function, the distance between two phases is weighed by a windowing function of the distance, which could be defined either in a piece-wise manner or a continuous manner. The rationale for doing this is to reduce the effect of inputs that large phase differences have on the target phase. In this way, the target phase moves towards the "centroid" of the incoming phases, weighted by their synaptic weights and their amplitudes, as well as being proportional to the target amplitude, such that inactive elements do not lock-in. In the absence of input, the classifier element tends to evolve according to its own period.

The notion of membership function can now be formally defined. For two elements to be phase-locked the average phase difference between them is required to remain constant over a small time window. More precisely, $\theta_{12}(t)=\theta_2(t)-\theta_1(t)|_{t=t_0}^{t=t_0+n\tau} \approx \Theta$ where n is a small integer (e.g., 5) and $\tau=<\tau_{i_0}>_i$ is the average natural period of the ensemble of elements. In other words, the elements are phase-locked if their instantaneous phase difference remains constant after a few complete cycles, which will discard phase coincidences. Hence, two or more phase-locked elements are considered to have the same membership value, as long as their phase difference is within a specified range. The precise range chosen is a parameter that depends upon the implementation. In this embodiment, the range for the phase difference was chosen to be 0.1 radians. In a more general setting, however, a range will not be required and a fuzzy membership function can be constructed for phase-locked elements as $0 \leq m = \Theta/2\pi \leq 1$, so that the formalism of fuzzy set theory can be applied to construct relationships between all the phase-locked elements.

In the third embodiment of the classification element, a model that does not require the comparison of the incoming membership value with the receiving element's own membership value is used. The method operates as follows:

An input layer consisting of receptors measures some property of the input.

A layer (layer a) of integrate-and-fire model neurons receives inputs from the receptor layer, whose membrane potentials, in absence of other classes of inputs, are described by:

$$V_i^a(t) = -gV_i^a(t) + \kappa I_i(t) + \epsilon_i(t)$$

where g is a leakage term, $I_i$ is the corresponding receptor input value, $\kappa$ is a proportionality factor (usually the inverse of the capacitance), and $\epsilon_i$ is a stochastic process with zero temporal average. When the membrane potential reaches a specified threshold, the neuron fires a spike and its membrane potential is reset to its resting value, so that if $V_i^a(t) \geq V_{th} \Rightarrow s_i^a(t)=1, V_i^a(t)=V_R$ otherwise $s_i^a(t)=1$.

A layer (layer b) of integrate-and-fire model neurons receives spiking input from the previous layer, such that:

$$\dot{V}_i^b(t) = -gV_i^b(t) + \mu \sum_j w_{ij}^{ab} \delta(t - s_j^a(t)) + \varepsilon_i(t)$$

where $\mu$ is a constant and $w_{ij} \geq 0$ is the strength of the connection between unit j in layer a and unit i in layer b. Notice that the intensity of the spikes is uniform for all elements in layer a, and their effect on the receiving element is only modulated by the weights.

A set of reciprocal connections exist between layer b and layer a, such that $w_{ij}^{ba} \geq 0$ and $w_{ij}^{ba} > 0$ iff $w_{ji}^{ba} > 0$. The effect of these feedback connections (hereafter termed resetting) on layer a is different from the effect of layer a connections on layer b. This resetting effect is described as follows: whenever the total resetting input into an element of layer a reaches a specified threshold, the element resets its membrane potential as if it had just spiked, $$\mu \sum_j w_{ij}^{ba} \delta(t - s_j^b(t)) \geq F_{th} \Rightarrow V_i^a(t) = V_R,$$

where $\mu$ and $F_{th}$ are constant and $s_i^b(t)$ is defined as in layer a.

Figure 7:
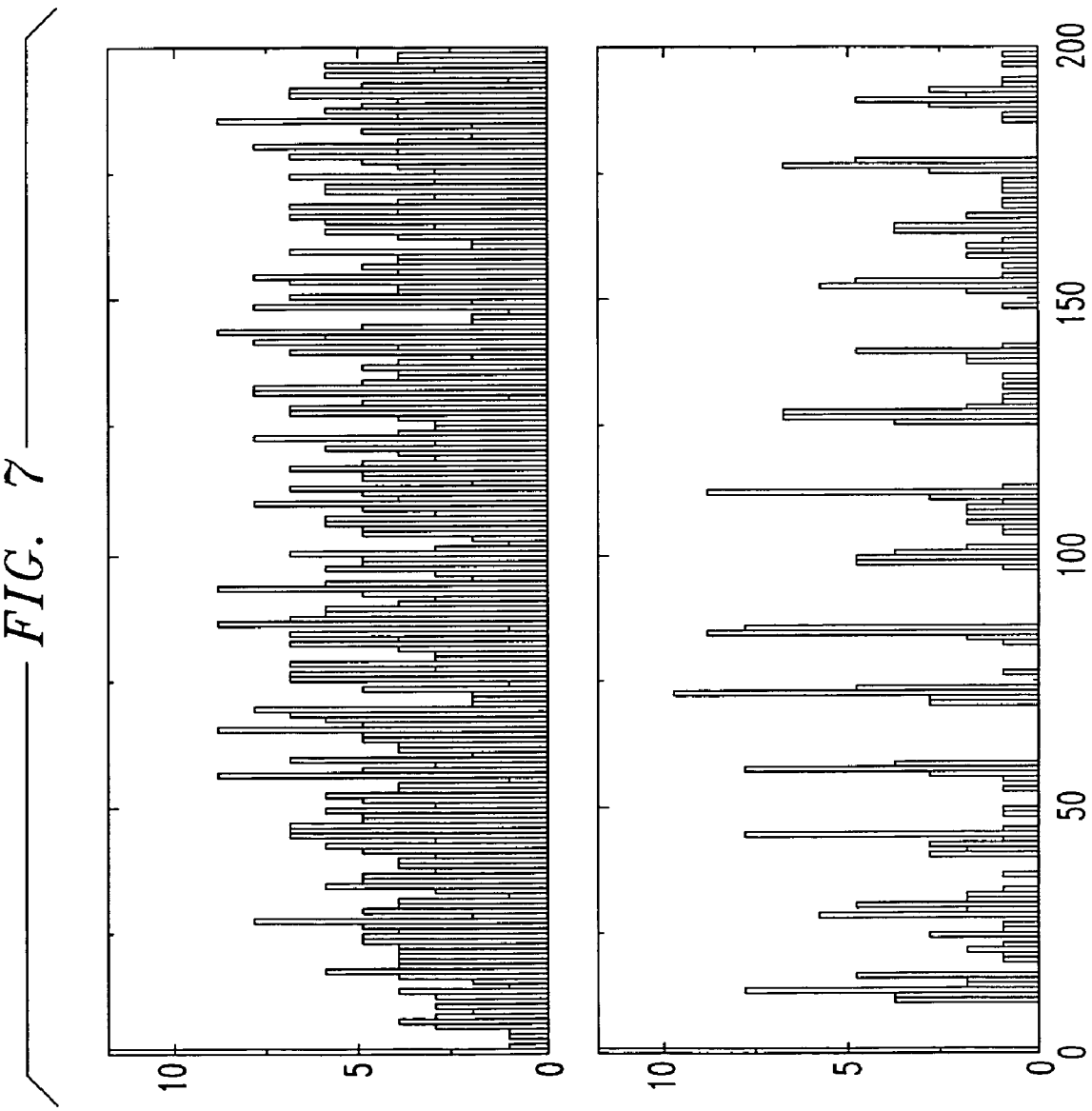
FIG. 7 is a chart illustrating integrate-and-fire model synchronization, according to a third embodiment of the present invention.

Referring now to FIG. 7, diagrams illustrate synchronization in the integrate-and-fire model, according to a third embodiment of the present invention. By virtue of the resetting feedback, elements in layers a and b that are reciprocally connected display synchronicity of their spiking activity, therefore labeling them without the need of a connectivity trace-back. The top panel represents the histogram of spiking activity in the input layer without feedback, and the bottom panel represents the histogram of spiking activity in the input layer with feedback.

Conceptually, FM classifiers are more general than the prior description suggests. An FM classifier can receive input information from other classifiers, sensors, control signals, and signals used for other purposes. Some of these signals will have both functional and membership values. Others may have one or the other. For example, sensors may not have membership information. As described above, some input information will be used for computing classification or functional relationships. However, some information might be used for other purposes, such as learning. Furthermore, the role that each input dimension has for computing the functional and membership values of the receiving classifier may vary. For example, feedforward and feedback input information may have different effects on the output values and function of the classifier. Thus, FM classifiers can be far more complex than the Perceptron-based description above.

FM classifiers can be used within a network to establish a coherent substrate of functionally related attribute representations. A network, in this case, refers to a possibly large set of FM classifiers, where the outputs of a subset of classifiers are used as input dimensions of others. Classifiers within these networks can be densely or sparsely interconnected. They may have highly structured patterns of connectivity, like hierarchical maps, or they may be random. By modulating the effects of functional inputs according to differences in membership values, the membership values of FM classifiers in these networks will tend to converge if there is a functional relationship. If there is no functional relationship, the membership values will evolve independently. As mentioned above, input dimensions with sufficiently disparate membership values will be ignored by the receiving classifiers.

The mechanisms described in the previous paragraph for evolving and using membership values will lead to one or more subnetworks of classifiers with similar membership values. These subnetworks will, for the most part, be functionally independent of each other. By adding additional mechanisms, such as making the membership values more dissimilar if a particular input dimension is not contributing to the classifier output, it is possible to achieve stronger partitioning of the network into subnetworks, where each subnetwork is functionally independent of the others, but where each of the classifiers within a single subnetwork is functionally related to others in that subnetwork.

Conceptually, the coherent substrate creation process first assigns each classifier to its own network partition or subnetwork. Then, through a cooperative process it merges functionally related partitions together until constraints or a lack of functional related activity limits the extent of the mergers. In this way, the partitions assign membership labels to their classifiers, so that it is possible to read out those labels and identify all the classifiers of any given functionally related partition.

It is now possible to describe the use of a coherent substrate of functionally related attribute representations to generate a response or action. The primary requirement is that there exist a means coupled to a response or action that can acquire a membership value of a functionally related subnetwork and then generate an output based on outputs of the classifier network that have been modulated by the differences between their membership values and the membership value of the subnetwork of interest. The simplest means for performing this role is an FM classifier.

Thus far, three embodiments of an FM classifier element have been described. A network organization of pulse-timing elements is now described that allows these elements to form a coherent substrate. There are two important issues that must be addressed in the creation of networks: the ability to treat inputs as arising from subsets or classes of sources, and the ability to learn the weights of connections.

Figure 8:
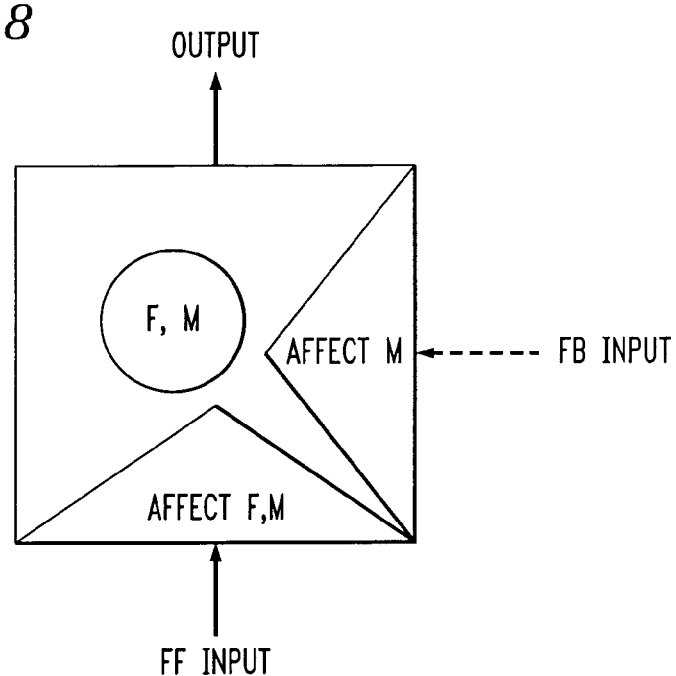
FIG. 8 is a diagram illustrating a division of inputs into an FM element, according to an embodiment of the present invention.

Referring now to FIG. 8, a diagram illustrates a division of inputs in an FM element into two different subsets, according to an embodiment of the present invention. In order to create flexible networks that can be used for a variety of tasks, the notion of classes of inputs is introduced. Each individual input belongs to an input class. For instance, this embodiment uses two input classes: FF or "feedforward," and FB or "feedback." As will be shown below, inputs within a given class have the same computational role within the receiving classifier. Furthermore, inputs within different classes perform different computational roles. Thus, feedforward and feedback inputs are treated differently by the receiving classifier.

Figure 9:
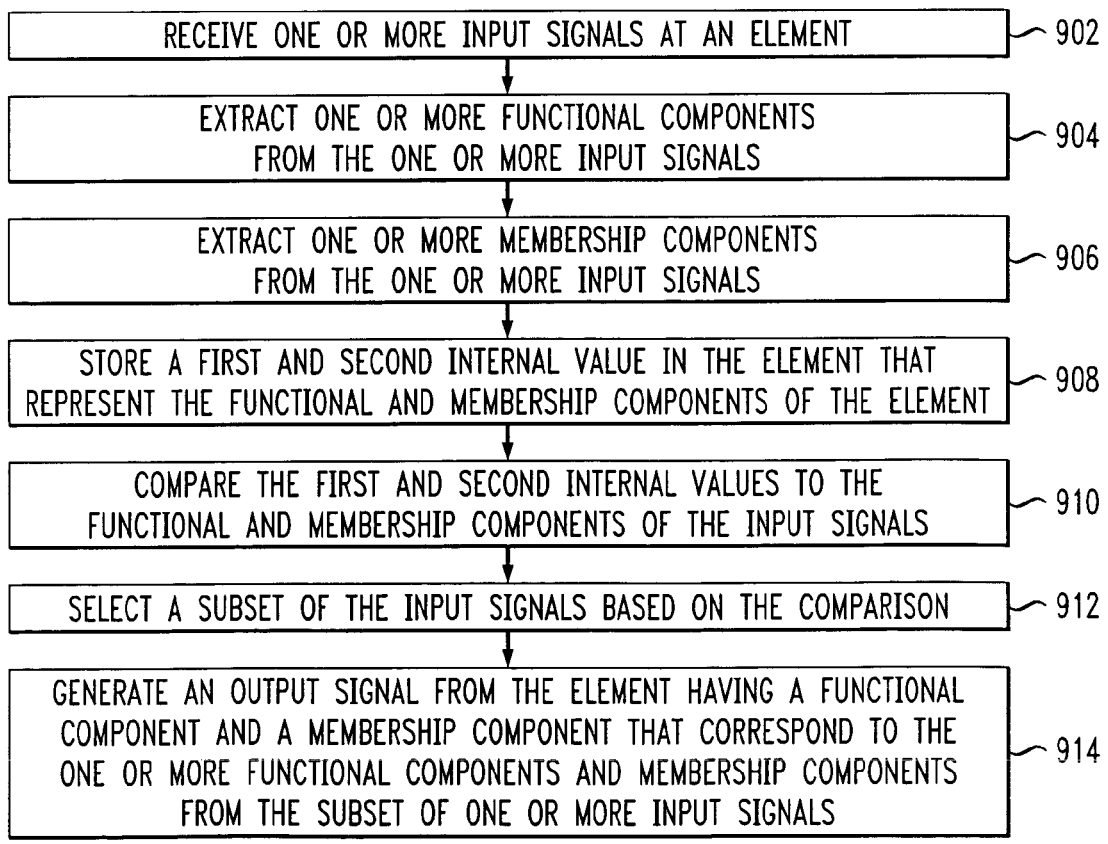
FIG. 9 is a flow diagram illustrating a signal transmission methodology through a classifier element of a classification system, according to an embodiment of the present invention.

Referring now to FIG. 9, a flow diagram illustrates a signal transmitting methodology through an element of a classification system, according to an embodiment of the present invention. In block 902, one or more input signals are received at the element. In block 904, one or more functional components are extracted from the one or more input signals. In block 906, one or more membership components are extracted from the one or more input signals. In block 908 a first and second internal value are stored in the element representing the functional and membership components of the element. The first and second internal values correspond to the functional and membership components of the input signals. In block 910, the internal values are compared to the functional and membership components of the input signals. In block 912, a subset of the input signals are selected based on this comparison. Finally, in block 914, an output signal is generated from the element having a functional component and membership component. The functional component and the membership component correspond to the one or more functional components and membership components from the subset of the one or more input signals.

Figure 10:
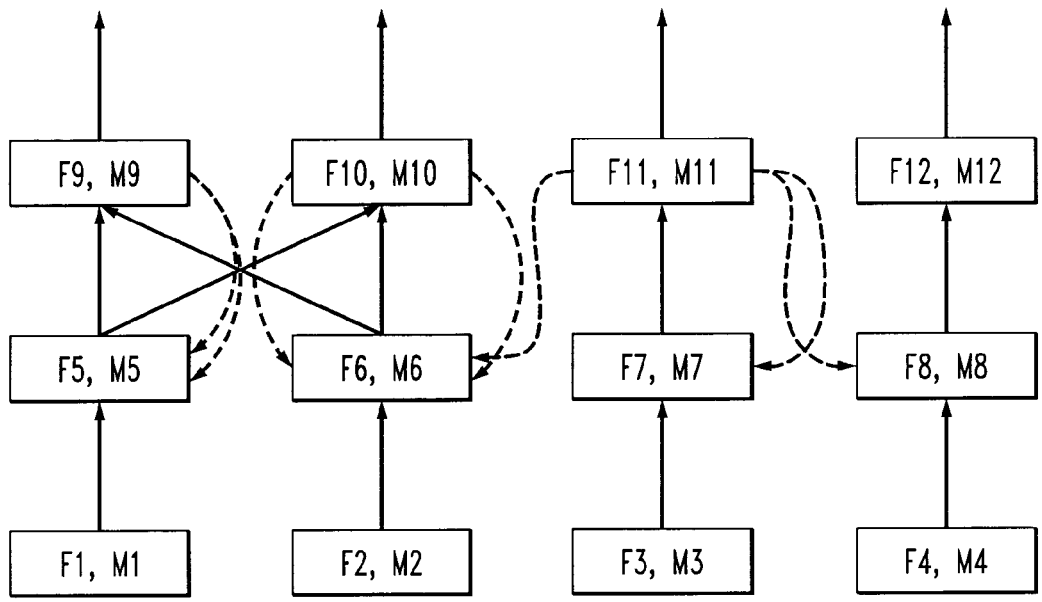
FIG. 10 is a diagram illustrating a network of FM classifiers, according to an embodiment of the present invention.

Referring now to FIG. 10, a diagram illustrates a network of classification elements, according to an embodiment of the present invention. Each element is represented by its functional value F and membership value M. Feed-forward connections are shown in solid lines, and feedback connections are shown in dashed lines. Within each map, the classifier element receives feed-forward connections from lower-level maps and feedback connections from higher level maps. A key aspect of this invention is that the receiving element is capable of differentiating between different subsets of inputs that it receives. Traditional classifiers such as neural networks do not make such a distinction. For instance, one can design an FM element such that the feed-forward connections affect both the amplitude and timing of the output pulses, whereas the feedback connections affect only the timing of the output pulses. With such a choice of the connectivity pattern, one can create hierarchical maps that are able to functionally relate attributes in low-level maps with attributes in higher-level maps. Alternate connectivity patterns and effects can be used as well within the scope of this invention, such as having the feedback connections affect both the functional value and the membership values, but in a different manner than feed-forward connections do.

Figure 11:
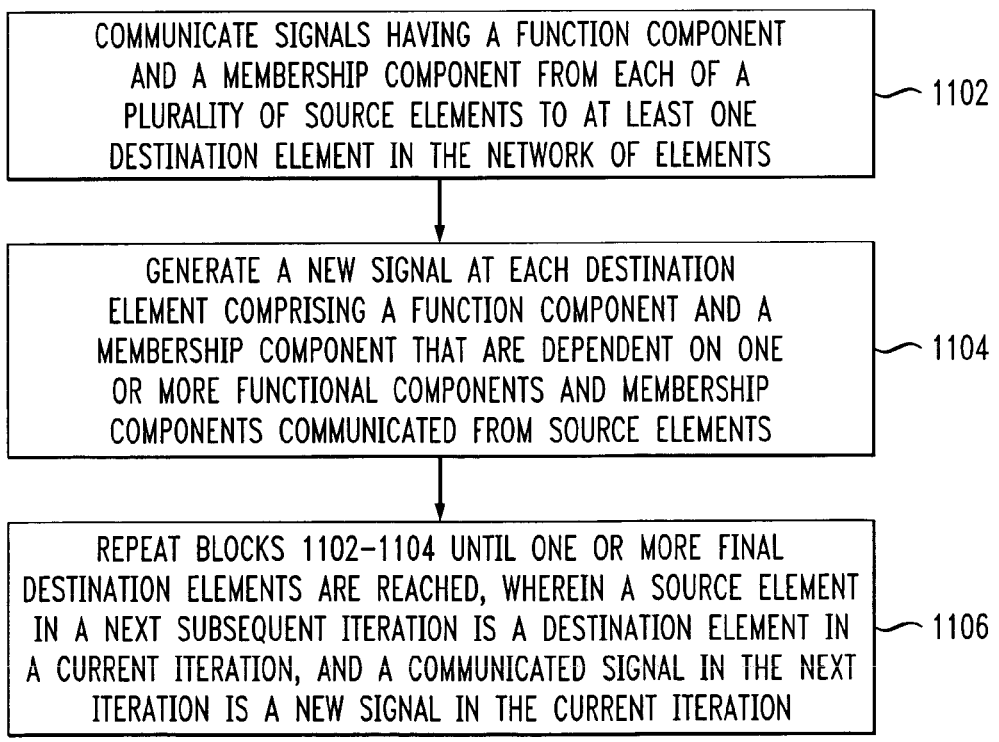
FIG. 11 is a flow diagram illustrating a signal transmission methodology in a network of classifier elements, according to an embodiment of the present invention.

Referring now to FIG. 11, a flow diagram illustrates a signal transmission methodology in a network of elements, according to an embodiment of the present invention. In block 1102, signals from each of a plurality of source elements are communicated to at least one destination element in the network of elements. Each signal comprises a functional component and a membership component. In block 1104, a new signal is generated at each destination element comprising a functional component and a membership component that are dependent on the one or more functional components and membership components communicated from the one or more respective source elements. Finally, in block 1106, the steps of communicating and generating are repeated until one or more final destination elements are reached. A given source element in a next subsequent iteration comprises the destination element in a current iteration, and a communicated signal in the next subsequent iteration comprises the new signal in the current iteration.

Figure 12:
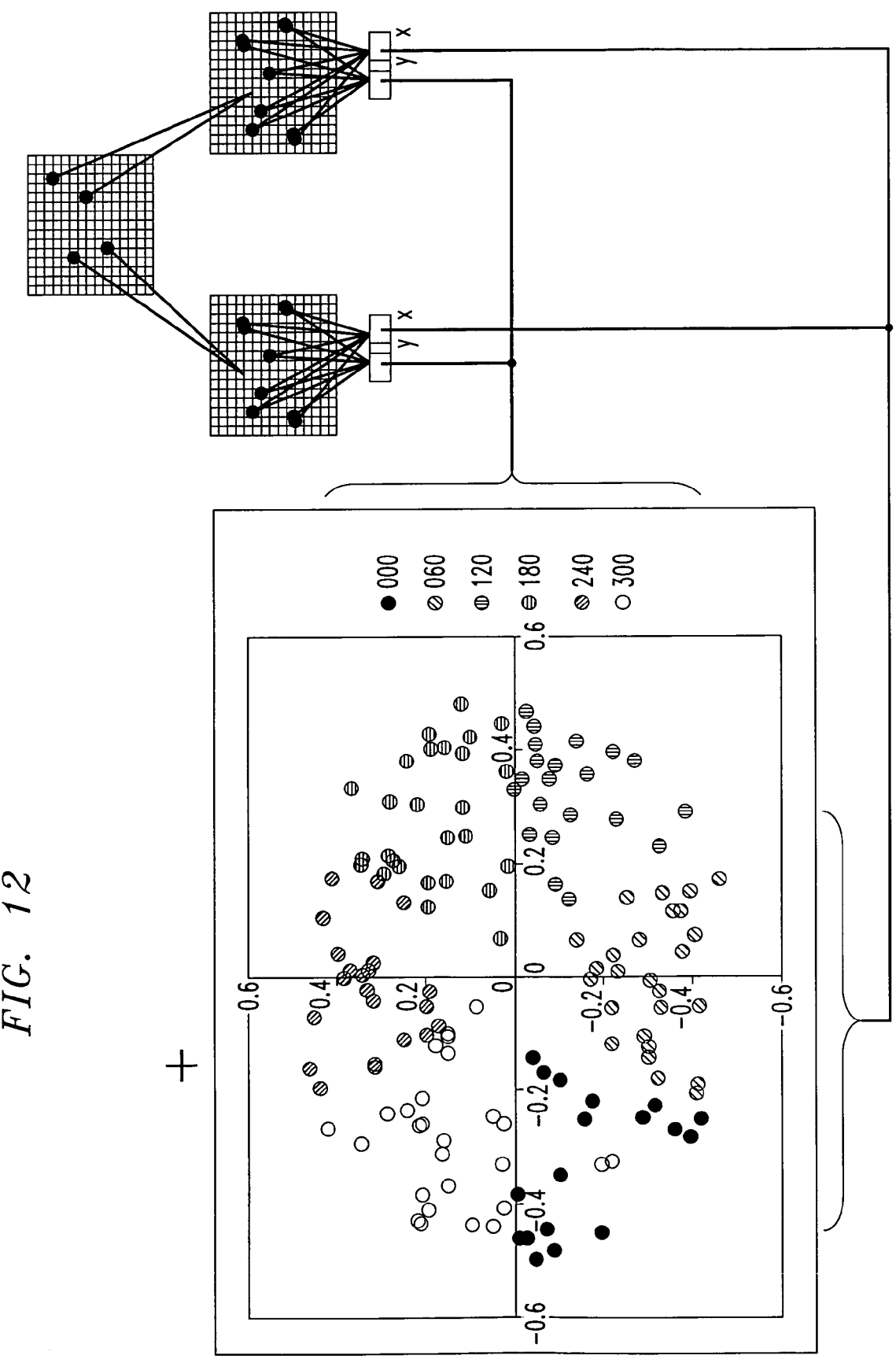
FIG. 12 is a diagram illustrating a result of a classification method, according to an embodiment of the present invention.

Referring to now to FIG. 12, a diagram illustrates the result of applying the classification method, according to an embodiment of the present invention. The details of the connectivity pattern between the hierarchical maps used in the preferred embodiment of the network will now be described. At the lowest hierarchy level there are two maps, termed V1L and V1R and consist of maps of FM classifiers that receive inputs from a 2D array of image sensors. Each element of the array of image sensors stores the pixel values of the image that is presented to the system. The size of the image array is 1 row by 2 columns. Each pixel consists of values in the range [0,1].

V1L and V1R, of size 10×10 elements, receive connections from the image layer such that every image pixel is connected to every element of V1L and V1R. In other words, there is all-to-all connectivity. Within the maps V1L and V1R there are local lateral excitatory and inhibitory connections of fixed weight, where the weights are selected to sample a Laplacian of Gaussian kernel of radius 10 pixels. The maps V1L and V1R establish connections with the second hierarchy level map, termed V2, whose size is 10×10 elements. Each element of V1L is connected to every element of V2, and the same is true of V1R. Thus there is all-to-all connectivity between the first and second hierarchy levels. V1L and V1R connect to V2 with connections that are labeled "feed-forward".

Within V2, there are local lateral excitatory and inhibitory connections of fixed weight, where the weights are selected to sample a Laplacian of Gaussian kernel of radius 10 pixels. V2 connects with both V1L and V1R with connections that are labeled "feedback". Each element of V2 is connected to every element of V1L and V1R through feedback connections.

A second issue is that of learning the weights of connections. A mechanism is described that can be used to perform modification of the synaptic weights. Hebb's rule is used, which states that units that fire together wire together. This rule is applied in two phases: weight adjustment, followed by weight normalization. In the weight adjustment phase, the weight $w_{ij}$ connecting a pre-synaptic element, i, with amplitude $\rho_i$ to a post-synaptic element, j, with amplitude $\rho_j$ is modified as follows:

$$w_{ij}^{new} = w_{ij}^{old} + \alpha \rho_i \rho_j.$$

Let there be N synapses made onto the element j. Let $$\sum_{i=1}^{N} w_{ij}^{new}$$

be the sum of the incident synaptic weights. During the second phase of weight normalization, the weight is changed as follows:

$$w_{ij} = \frac{w_{ij}^{new}}{\sum_{i=1}^{N} w_{ij}^{new}}.$$

This procedure may be applied to the synaptic weights of specific connection classes. For instance, the synaptic weights of feedforward connections can be modified, whereas the synaptic weights of feedback connections can remain fixed. Various such combinations can be employed for different classes. Furthermore, one is not restricted to using Hebb's rule, and alternate mechanisms can be employed for changing the weights.

The above mechanism implies that learning is constantly taking place during the computation. Learning may be restricted to take place only in the presence of a learning signal, Λ. This modifies the Hebbian rule as follows:

$$w_{ij}^{new} = w_{ij}^{old} + \Lambda \alpha \rho_i \rho.$$

A learning signal can be derived from the inputs, or a comparison between the output value of the classifier element and the outputs of its neighbors. For instance, if the output value of the classifier element is high, while the outputs of its neighbors are high, the learning signal is a strong positive. On the other hand, if the output value of the classifier element is high, while the outputs of its neighbors are low, the learning signal is strong negative, indicating that the weights must be decreased. It is understood that various such combinations of the learning signals may be applied to modify synaptic learning.

By applying the network connectivity pattern as described above to a network of pulse timing FM elements, the following behavior is observed. The FM elements that are functionally related become synchronized with each other. In other words, the firing patterns of a pair of functionally related elements have a fixed relationship with each other, consisting of a fixed time delay.

Figure 13:
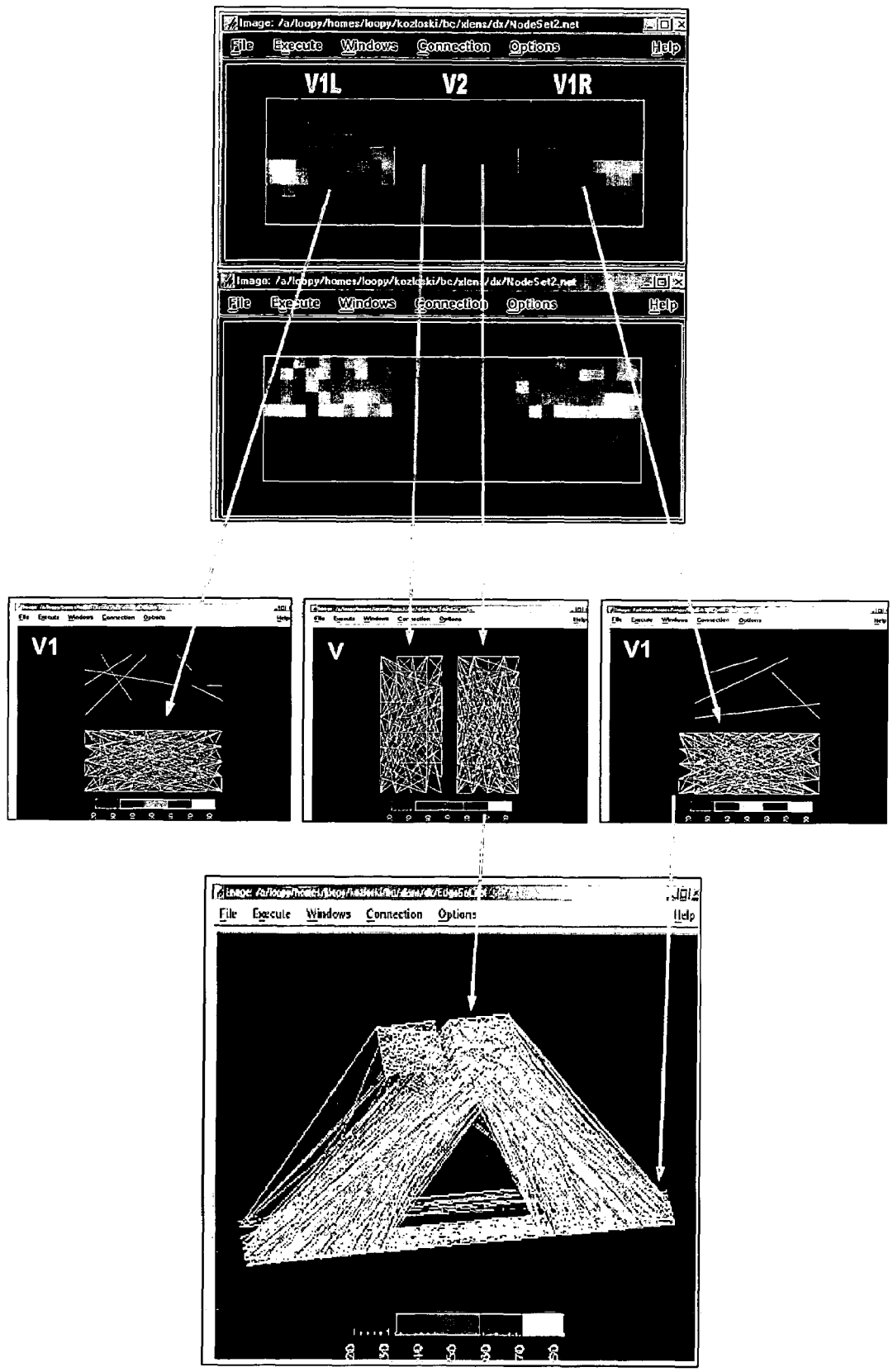
FIG. 13 is a diagram illustrating a result of synchronization between two networks, according to an embodiment of the present invention.
Figure 14:
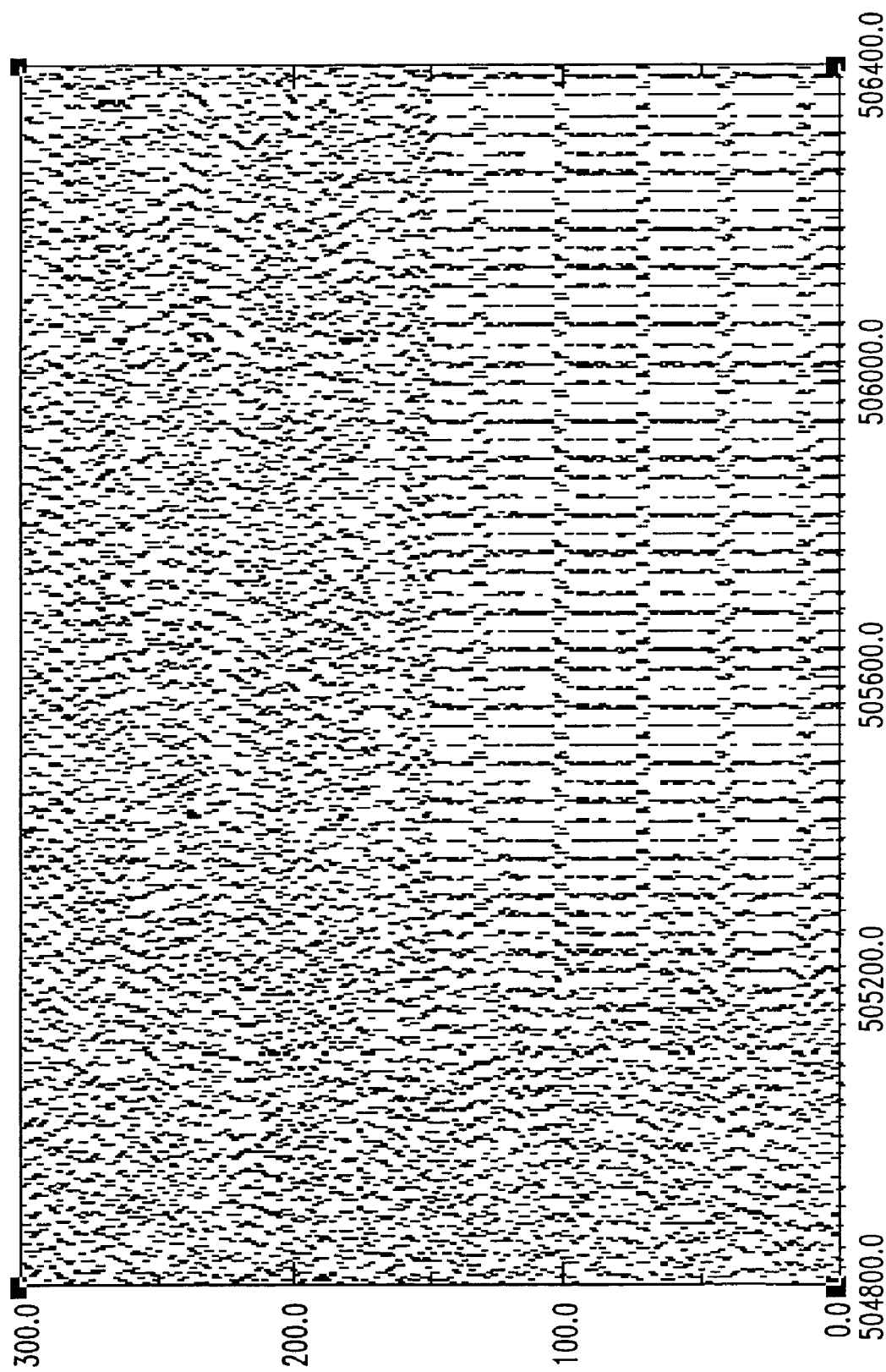
FIG. 14 is a diagram illustrating synchronization of pulses, according to an embodiment of the present invention.

The result of implementing the synchronization of timing is shown in FIGS. 12, 13 and 14. The training of the feed-forward connections is done following a self-organized algorithm described in the prior art, and the training of the feedback connections is done with a simple Hebbian algorithm, as described in the section on learning mechanisms.

Referring now to FIG. 13, a diagram illustrates the result of achieving synchronization between two networks, according to an embodiment of the present invention. The response to the inputs is topographically organized in all the arrays; when an input is presented, the corresponding areas of V1L and V1R that classify the input are synchronized with the area of V2 that classifies the V1L and V1R input. This is represented by the bright links between the elements in each array. The areas of V1L and V1R that are not part of the classification are desynchronized, whereas the area of V2 that is not part of the classification is synchronized within itself but with a large phase lag with respect to the main classification area.

Referring now to FIG. 14, a diagram illustrates a pulsatile component of all the elements. The synchronized elements line up perfectly with the timing of the pulse, and the remaining elements of V2, though synchronized, are lagging them.

In this embodiment, the phase-amplitude FM classifier elements are connected in a network using hierarchical maps as previously described in the synchronization of timing embodiment. These phase-amplitude FM classifier elements achieve the state of a coherent substrate through the mechanism of phase-locking, which results when the mathematical model described in the amplitude-phase FM element embodiment is applied.

Figure 15:
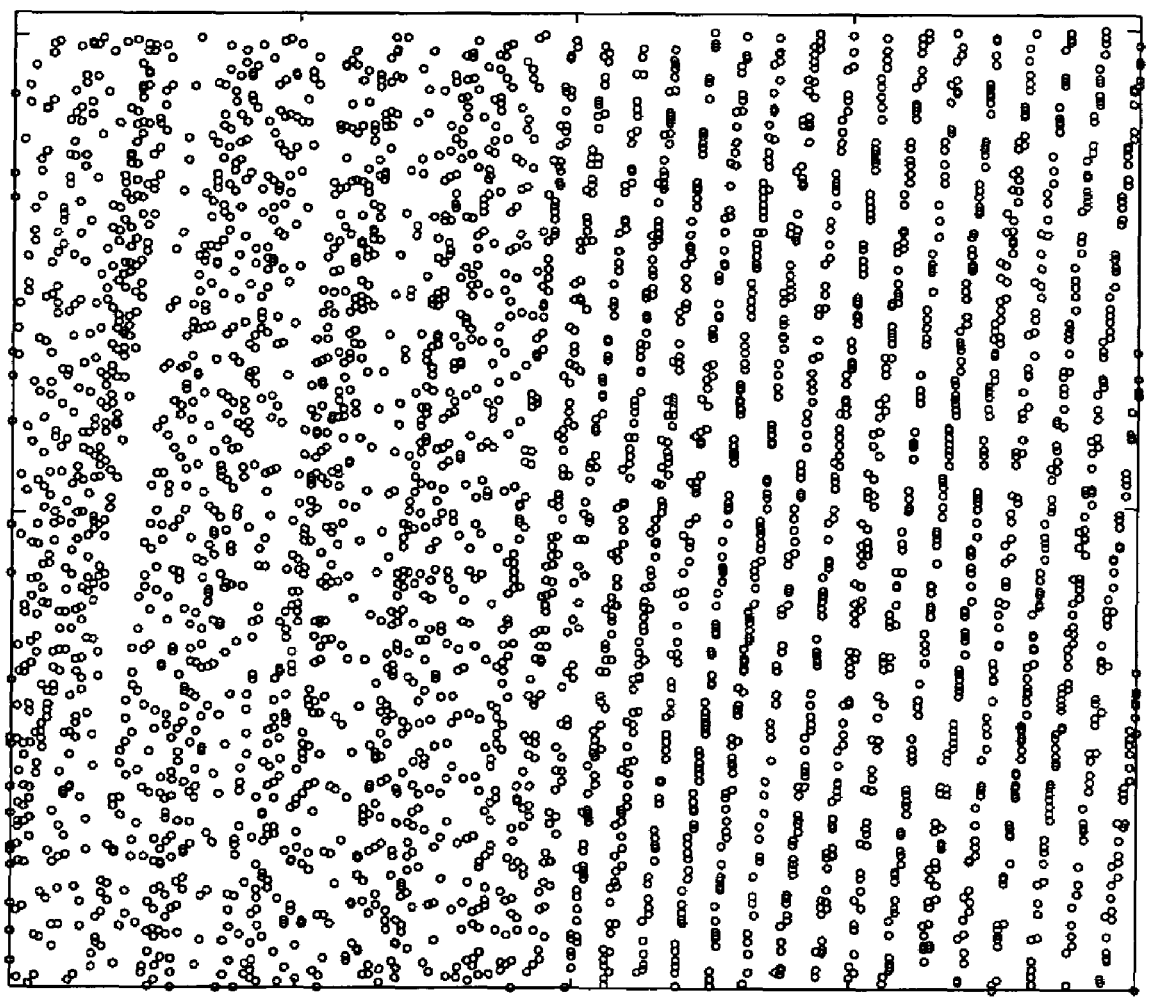
FIG. 15 is a diagram illustrating an evolution of active elements in an input layer of a phase model, according to an embodiment of the present invention.

Referring now to FIG. 15, a diagram illustrates an evolution of active elements in the input layer of the phase model. The mechanism of phase-locking implies that two amplitude-phase FM elements which share a functional relationship with each other are phase-locked. Thus, by observing whether two amplitude-phase FM elements are in phase-lock, it may be determined whether they are functionally related. FIG. 15 shows how the active elements of the input layer coalesce into clusters of coherent phase evolution. The vertical axis represents phase (0, 2π) and the horizontal axis represents time. The system settles in the locked state after a transient of a few total rotations.

For simplicity, each input unit is connected to only one receptor element. Only a sparse population of these receptor elements is active during the presentation of a stimulus ($p(\rho^I > 0) = 0.2$ in the example of the figure). The connectivity between the input layer and the upper layer is sparse and random ($p(w^{FF} > 0) = 0.3$ in the example), whereas feedback connections are strictly reciprocal, so that $w_{ij}^{FB} > 0$ iff $w_{ji}^{FF} > 0$.

Alternatively, it is possible to utilize a different setup for the feedback architecture that attains the same result. Instead of resorting to precise reciprocity, the feedback connectivity can be established by a simple Hebbian learning mechanism, such that the update equation during training is $\delta w_{ij}^{FB} \propto \rho_i^I \rho_j^U$, with the net result that only units that are connected by feed-forward connections, and therefore tend to be activated together, will have significant feedback connections.

Referring now to FIG. 16, the role of feedback in the phase model is illustrated, according to an embodiment of the present invention. The top left panel represents the phase evolution of active elements of the input layer and the bottom left panel represents the elements of the second layer when there is no feedback. The right panels show the corresponding evolution when the feedback is present. The second layer displays phase clusters in correspondence with the input layer. FIG. 16 shows an ensemble of 100 input units sparsely connected to 100 units in the second layer, with the feedback connectivity pattern described in the previous section; for simplicity, only the input layer units are shown.

Referring now to FIG. 17, synchronization without function/membership values is illustrated. The top panel represents the activity of the input layer in the integrate-and-fire network model, when there is not feedback from the second layer. The bottom panel shows the effect of including feedback. Synchronization is enforced to the expense of a reduction in the overall level of activity. The vertical axis represents an arbitrary ranking of the units. The horizontal axis is time. The presence of a dash represents the occurrence of a spike in the corresponding unit. Feedback creates phase-lock in both layers.

Thus far, the manner in which a coherent substrate of FM classifier elements can be obtained has been described. A method to utilize the information in the coherent substrate to achieve a desired response is now described. The coherent substrate will consist of a set of hierarchical maps such that all the functionally related classifier elements share a coherent membership value. With reference to the scenario described in the background, all the functionally related classifier elements that participate in the formation of the "tulip" object have a coherent membership value. This could be achieved for instance by using the phase-locking embodiment. The remaining task is to direct the contour-coloring means to the right locations.

Figure 18:
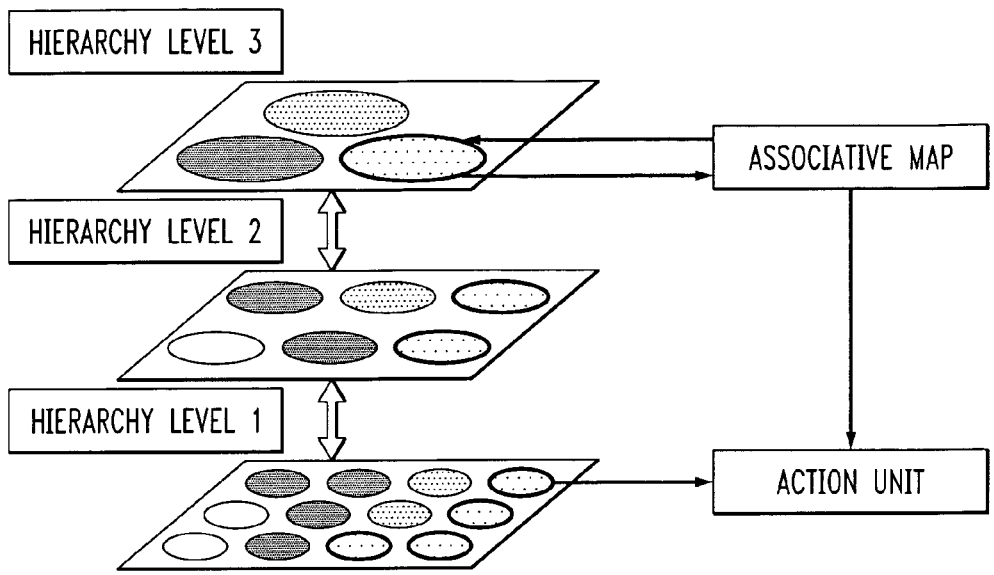
FIG. 18 is a diagram illustrating a coherent substrate problem, according to an embodiment of the present invention.

FIG. 18 shows a schematic of the result after applying the synchronization of timing embodiment. This result is shown for three hierarchy levels, with level 1 being the most detailed representation and level 3 being the most abstract. FIG. 18 shows that the synchronization of timing embodiment has succeeded in identifying regions within the different maps that are related through synchronization across hierarchy levels. For instance, the dark region in hierarchy level 3 is synchronized with the dark regions of hierarchy levels 2 and 3. However, having this solution to the coherent substrate method does not necessarily mean that that right action will be taken.

A general method whereby a system responsible for taking action is able to interface with the coherent substrate is now presented. An associative map is needed, which is able to recognize regions of interest in the highest map, at the highest level of abstraction. Suppose the region of interest is the dotted region, outlined in bold at the highest level. Due to the formation of a coherent substrate, this region is related to other attributes at lower levels, also outlined in bold. The label of the region of interest at the highest hierarchy level action unit is passed as a key or index to the action unit. The action unit then uses this key to identify those regions at the lower level maps that share this common key.

Figure 19:
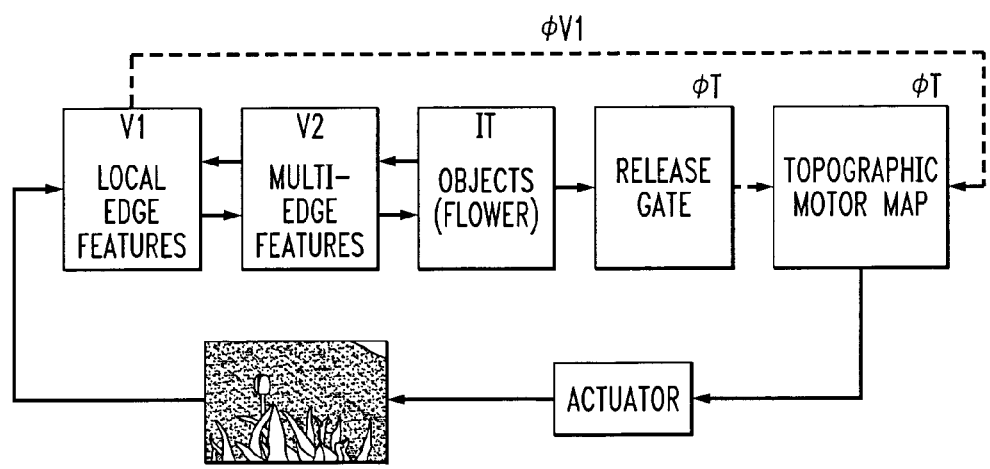
FIG. 19 is a flow diagram illustrating a coherent substrate interface methodology, according to an embodiment of the present invention.

The precise details of operation are explained with reference to FIG. 19. Suppose that each classifier element consists of amplitude and a pulse time, in such a way that amplitude corresponds to the functional value and pulse time to the membership value. Processing elements exchange amplitude and timing information, and compute their own amplitude and pulse time based on their inputs. There are re-entrant connections between maps, termed V1, V2 and IT, as shown in FIG. 19.

Edge classifiers have "feedforward" connections to contour classifiers, and contour classifiers have feedforward connections to the tulip classifier. Similarly, the tulip recognizer has feedback connections to the contour classifiers and the contour classifiers have feedback connections to the edge classifiers. Feedforward connections are used for computing both functional and membership values of the receiving classifier. Whereas, feedback connections affect only the membership values. Consider, in addition, an array of FM classifiers, where each is coupled to a means for coloring a single pixel of the image. Each of these FM classifiers receives inputs from edges that are topographically registered with the pixel the FM classifier colors through the coloring means. In addition, each FM classifier receives multiple inputs from the tulip recognizer. The balance of edge and tulip inputs is such that both edge recognition and tulip recognition is required for the FM classifiers to produce a positive functional value. Such a system is sufficient to solve the problem.

The process by which the above system solves the pixel coloring problem is described as follows. When a tulip does not exist in the image, the FM classifiers do not have enough input information to exceed their threshold for producing the positive functional output that is necessary to cause the pixel coloring means to act. Therefore, no pixels are colored. When a tulip is present in the image, there must be edge information for an FM classifier to produce a positive output and that edge information must be functionally related to the FM classifier. This will happen when the edge and tulip classifiers are functionally related to each other. The edge classifiers that do not contribute to the tulip recognition will not have a functional relationship with the tulip classifier and they will have a different membership value. In contrast, those edge classifiers that do contribute to the tulip classifier will be functionally related and have the same membership value. Thus, only the FM classifiers that are topographically registered with the edge classifiers that contributed to the tulip classifier will produce an output suitable to cause the coloring means to act.

The associative maps described in FIGS. 8 and 10 can be formed through a self-organized learning process. This organization is based on the frequency of occurrence of different stimuli to the system. Each map within the hierarchy is self-organizing. For instance, at the lowest level of the hierarchy, the classifier elements organize themselves based on their response to lines of different orientation. The net result is an orientation map like the one found in the area V1 of the human visual cortex. Similar processes operate in the maps at different hierarchy levels.

The recognition of categories at the highest hierarchy level, say IT is done as follows. IT can be decomposed into two maps such that the first map computes the magnitude of the Fourier transform of the input from the preceding level, which consists of contours. Thus the magnitude Fourier Transform map contains frequency spectrum information related to contours anywhere in the input image. There is sufficient information in the magnitude Fourier Transform map to detect different types of shapes, such as circle, square, and tulip. The second map within IT is a "tulip-recognizer", which signals the presence of a tulip. This can be done in a hard-coded fashion, by examining the magnitude Fourier Transform map, and imposing constraints on the various elements on the map.

Another candidate for a solution to the tulip recognition problem at the level of IT is described as follows. IT can be decomposed into two levels, where the first level consists of a set of maps such that each one is capable of recognizing a tulip of fixed size and orientation at a fixed location within an image. For instance, one map within this set can detect a tulip whose center is at image location consisting of the tenth row and tenth column. This detection process can be hard-coded. The second level IT map performs an "OR" operation on the outputs of the first level IT maps, such that if at least one first level IT map signals the presence of a tulip, the output of the second level IT map is a "1", indicating the presence of a tulip anywhere within the image.

The map at the IT level shows that the system has characterized an object in the scene to be a tulip. This characterization is based strictly on the amplitudes, i.e. the functional values of the elements that form the category "tulip". Let $S_T$ be the synchronized pulse times of these elements that represent the category "tulip" in a particular input image. Due to re-entrant feedback connections with the lower layers, the features in V1 and V2 that contributed to the flower also get synchronized with the same pulse time, $S_T$.

Consider next a sub-system designed to respond to the presence of the desired object, say the coloring means that colors the contours of the tulip. First, a gate is needed, which initiates the coloring behavior, since it is desirable for this behavior to occur only when a flower is identified. In addition, information is provided about the synchronization time $S_T$ to the gate. The gate receives inputs from each of the elements of the IT map. The gate produces two outputs. If at least one of the inputs from the IT map signals the presence of a desired category, say "tulip", the first output of the gate is a "1", indicating that a response needs to be taken. Furthermore, when the first output of the gate is a "1", its second output is the pulse time of the desired category in IT, termed $S_T$, the synchronization time or the reference pulse time.

The gate supplies this information to a topographic motor map (TMM) of size 10×10 elements that provides motor commands to the coloring means. The TMM is such that the activation of one of its elements elicits the execution of a motor program that makes instructs the coloring means to access a particular position in the visual field. The spatial layout of the TMM is co-registered with visual field, such that nearby elements in the TMM correspond to motor programs for accessing nearby positions in the visual field. The TMM also receives connections from V1, the lowest hierarchy level, through an identity map, where the weights of all the connections are 1. The processing units in TMM simply detect a coincidence of synchronization times between the input from V1 and the second input from the gate, $S_T$. In other words, each unit in TMM responds strongly if the timing of its input from V1 matches the reference synchronization time $S_T$. Once such a TMM has been created, the coloring means accesses the locations provided by the TMM, thereby coloring the pixels indicated by these locations This action constitutes a solution to the stated problem of changing the color of image pixels representing the contours of the tulip.

Though this embodiment has been described in terms of the synchronization of timing embodiment, the description is identical for the phase-locking embodiment, except that phase-locking of phases is used instead of synchronization of pulse times as a means for determining the functional relationships.

The method described in this embodiment enables the formation of a coherent substrate based on functionally related attributes of an input space for the generation of appropriate responses. Furthermore, and by design, the capabilities of this invention mimic those of the cortex of the brain. It is, therefore, a critical stepping stone toward the development of technology with the capabilities of the human brain.

Figure 20:
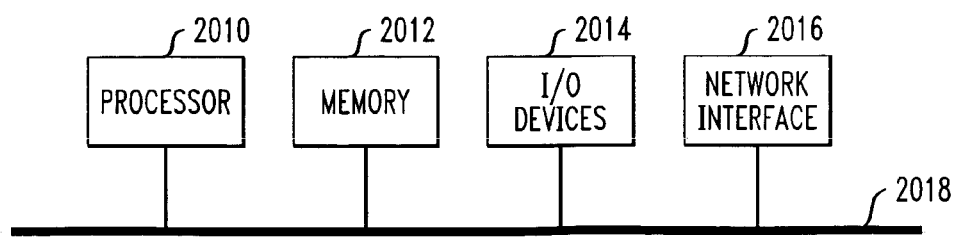
FIG. 20 is a diagram illustrating an illustrative hardware implementation of a computing system in accordance with which one or more components/methodologies of the present invention may be implemented, according to an embodiment of the present invention.

Referring now to FIG. 20, a block diagram illustrates an illustrative hardware implementation of a computing system in accordance with which one or more components/methodologies of the invention may be implemented, according to an embodiment of the present invention. As shown, the computer system may be implemented in accordance with a processor 2010, a memory 2012, I/O devices 2014, and a network interface 2016, coupled via a computer bus 2018 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope of spirit of the invention.

What is claimed is:

1. A method of transmitting at least one signal through an element of a classification system comprising the steps of:
   receiving one or more input signals relating to an image at the element;
   extracting one or more functional components from the one or more input signals, wherein the one or more functional components correspond to a classification type;
   extracting one or more membership components from the one or more input signals, wherein the one or more membership components correspond to a relationship measure between the one or more input signals and the element; and
   generating an output signal that changes a color of one or more pixels in the image from the element comprising a functional component and a membership component that correspond to one or more of the functional components and membership components from the one or more input signals, wherein the one or more membership components from the one or more input signals modulate an effect of the one or more functional components from the one or more input signals on the generation of the output signal, and wherein the one or more membership components of the one or more input signals alter the membership component of the output signal.

2. The method of claim 1, further comprising the step of storing in the element a first internal value representing a functional component of the element and a second internal value representing a membership component of the element.

3. The method of claim 2, wherein, in the step of generating an output signal, the functional component and the membership component of the output signal correspond to the first internal value and the second internal value, respectively.

4. The method of claim 2, wherein the step of generating an output signal further comprises the steps of:
   comparing the functional and membership components of the one or more input signals to the first internal value and the second internal value; and
   selecting a subset of the one or more input signals based on the comparison, wherein the subset comprises one or more functional and membership components to which the functional component and membership component of the output signal correspond.

5. The method of claim 1, wherein the step of generating an output signal further comprises the step of:
   selecting an arbitrary subset of the one or more input signals comprising one or more functional components and membership components to which the functional component and membership component of the output signal correspond.

6. The method of claim 1, wherein the step of generating an output signal further comprises the step of modifying the output signal through a learning mechanism corresponding to a subset of the one or more input signals.

7. The method of claim 1, wherein the step of generating an output signal further comprises the step of computing a non-linear function of a weighted sum of a subset of the one or more functional components of the one or more input signals in generating the functional component of the output signal.

8. The method of claim 7, wherein the step of computing a non-linear function further comprises the step of applying a scalar value to each of the one or more functional components of the one or more input signals.

9. The method of claim 7, wherein the step of computing a non-linear function further comprises the step of applying a product of a scalar value and a computed value to each of the one or more functional components of the one or more input signals.

10. The method of claim 7, wherein the step of computing a non-linear function further comprises the step of modifying a scalar portion of at least one weight applied in the weighted sum.

11. The method of claim 10, wherein the step of modifying a scalar portion of at least one weight further comprises the step of adjusting one or more subsets of weights through at least one learning mechanism.

12. The method of claim 11, wherein, in the step of adjusting one or more subsets of weights, the at least one learning mechanism is dependent on learning signals corresponding to one or more input signals, internal values of the element, and the output signal.

13. The method of claim 11, wherein, in the step of adjusting one or more subsets of weights, at least two subsets of input signals contribute to the step of generating an output signal, wherein at least one subset of input signals comprises fixed weights and at least one other subset of input signals comprises adjustable weights.

14. The method of claim 13, wherein, in the step of adjusting one or more subsets of weights, a learning signal controlling the at least one learning mechanism of the adjustable weights is computed from a weighted sum of input signals from the at least one subset of input signals comprising fixed weights.

15. The method of claim 7, wherein, in the step of computing a non-linear function, the non-linear function comprises a sigmoid.

16. The method of claim 7, wherein, in the step of computing a nonlinear function, after weight adjustments a vector formed by the weights has a predetermined length.

17. The method of claim 1, wherein, in the step of generating an output signal, the membership component of the output signal comprises a reference time.

18. The method of claim 17, wherein, in the step of generating an output signal, the reference time corresponds to a classifier element internal value and reference times of the one or more input signals.

19. The method of claim 18, wherein the step of generating an output signal further comprises the step of computing a weighted average of the differences between the reference time of the classifier element and the reference time of each input signal, wherein the weight is a function of the functional component and the reference time difference of the corresponding input signal.

20. The method of claim 1, wherein, in the step of generating an output signal, each membership component of the one or more input signals are represented in a plurality of dimensions.

21. The method of claim 20, wherein a dimensional space formed by a plurality of membership components is a hyper-sphere.

22. The method of claim 1, wherein, in the step of generating an output signal, the membership component is represented by a circular variable.

23. The method of claim 1, wherein, in the step of generating an output signal, the membership component is represented by a phase.

24. The method of claim 1, wherein, in the step of receiving one or more input signals, the one or more input signals comprise at least one feedforward signal and at least one feedback signal.

25. The method of claim 24, wherein, in the step of generating an output signal, the functional component of the output signal corresponds to the one or more functional components of the at least one feedforward signal.

26. The method of claim 24, wherein, in the step of generating an output signal, the membership component of the output signal corresponds to the one or more membership components of the at least one feedforward signal and the at least one feedback signal.

27. A method of transmitting signals in a network of elements comprising the steps of:

communicating signals relating to an image from each of one or more source elements to at least one destination element in the network of elements, wherein each signal comprises a functional component and a membership component;

generating a new signal that changes a color of one or more pixels in the image at each destination element comprising a functional component and a membership component that correspond to one or more functional components and membership components communicated from one or more respective source elements, wherein the membership components from the one or more respective source elements modulate an effect of the functional components from the one or more respective source elements on the generation of the new signal, and wherein the membership components of the one or more respective source elements alter the membership component of the new signal; and repeating the steps of communicating signals and generating anew signal until one or more final destination elements are reached, wherein a given source element in a next subsequent iteration comprises the destination element in a current iteration, and a communicated signal in the next subsequent iteration comprises the new signal in the current iteration.

28. The method of claim 27, wherein the step of generating anew signal comprises the step of comparing the membership component of the at least one destination element with the membership component of the one or more source elements when the connections between the at least one destination element and the one or more source elements comprise at least two connection types that produce different effects on the functional and membership components of the at least one destination element.

29. The method of claim 27, wherein, in the step of communicating signals, the one or more source elements and at least one destination element each comprise a sub-network of elements extracting different features from an input network.

30. The method of claim 27, wherein the step of repeating the steps of communicating signals further comprises the step of communicating signals through a hierarchy of sub-networks where lower sub-networks extract local features, and higher sub-networks extract global features.

31. The method of claim 27, wherein the step of repeating the steps of communicating signals further comprises the steps of:
  activating a decision-making sub-network by the presence of one or more global features; and
  comparing functional and membership components of higher and lower sub-networks, such that only those elements in the lower sub-networks with a high functional component and a membership component similar to the membership component of one or more global features in the higher sub-network are selected to be acted upon.

32. Apparatus for transmitting at least one signal through an element of a classification system, comprising:
  a memory; and
  at least one processor coupled to the memory and operative to: (i) receive one or more input signals relating to an image at the element; (ii) extract one or more functional components from the one or more input signals, wherein the one or more functional components correspond to a classification type; (iii) extract one or more membership components from the one or more input signals, wherein the one or more membership components correspond to a relationship measure between the one or more input signals and the element; and (iv) generate an output signal that changes a color of one or more pixels in the image from the element comprising a functional component and a membership component that correspond to one or more functional components and membership components from the one or more input signals, wherein the one or more membership components from the one or more input signals modulate an effect of the one or more functional components from the one or more input signals on the generation of the output signal, and wherein the one or more membership components of the one or more input signals alter the membership component of the output signal.

33. The apparatus of claim 32, further comprising the operation of storing in the element a first internal value representing a functional component of the element and a second internal value representing a membership component of the element.

34. The apparatus of claim 33, wherein, in the operation of generating an output signal, the functional component and the membership component of the output signal correspond to the first internal value and the second internal value, respectively.

35. The apparatus of claim 33, wherein the operation of generating an output signal further comprises the operations of:
  comparing the functional and membership components of the one or more input signals to the first internal value and the second internal value; and
  selecting a subset of the one or more input signals based on the comparison, wherein the subset comprises one or more functional and membership components to which the functional component and membership component of the output signal correspond.

36. The apparatus of claim 32, wherein the operation of generating an output signal further comprises the operation of:
  selecting an arbitrary subset of the one or more input signals comprising one or more functional components and membership components to which the functional component and membership component of the output signal correspond.

37. The apparatus of claim 32, wherein the operation of generating an output signal further comprises the operation of modifying the output signal through a learning mechanism corresponding to a subset of the one or more input signals.

38. The apparatus of claim 32, wherein the operation of generating an output signal further comprises the operation of computing a non-linear function of a weighted sum of a subset of the one or more functional components of the one or more input signals in generating the functional component of the output signal.

39. The apparatus of claim 32, wherein, in the operation of receiving one or more input signals, the one or more input signals comprise at least one feedforward signal and at least one feedback signal.

40. The apparatus of claim 39, wherein, in the operation of generating an output signal, the functional component of the output signal corresponds to the one or more functional components of the at least one feedforward signal.

41. The apparatus of claim 39, wherein, in the operation of generating an output signal, the membership component of the output signal corresponds to the one or more membership components of the at least one feedforward signal and the at least one feedback signal.

42. An article of manufacture for transmitting at least one signal through a element of a classification system, comprising a machine readable medium containing one or more programs which when executed implement the steps of:
  receiving one or more input signals relating to an image at the element;
  extracting one or more functional components from the one or more input signals, wherein the one or more functional components correspond to a classification type;
  extracting one or more membership components from the one or more input signals, wherein the one or more membership components correspond to a relationship measure between the one or more input signals and the element; and
  generating an output signal that changes a color of one or more pixels in the image from the element comprising a functional component and a membership component that correspond to one or more of the functional components and membership components from the one or more input signals, wherein the one or more membership components from the one or more input signals modulate an effect of the one or more functional components from the one or more input signals on the generation of the output signal, and wherein the one or more membership components of the one or more input signals alter the membership component of the output signal.

* * * * *

UNITED STATES PATENT AND TRADEMARK OFFICE
CERTIFICATE OF CORRECTION

PATENT NO. : 7,287,015 B2
APPLICATION NO. : 10/955141
DATED : October 23, 2007
INVENTOR(S) : G.A. Cecchi et al.

It is certified that error appears in the above-identified patent and that said Letters Patent is hereby corrected as shown below:

In the specification:

Col. 9, line 66, delete "a" after the word 'an' and insert -- arbitrary limiting --

Col. 13, line 51, delete "$\tau_i^R$" and insert -- $\rho_i^R$ --

Col. 14, line 24, delete "$\Gamma_2$" and insert -- $\theta_2$ --

In the claims:

Claim 27, Col. 26, line 42, insert -- -- inbetween 'a' and 'new' in the word 'anew'

Signed and Sealed this

Sixth Day of May, 2008

JON W. DUDAS
*Director of the United States Patent and Trademark Office*